US012785371B2

(12) United States Patent
Yamaguchi et al.

(10) Patent No.: US 12,785,371 B2
(45) Date of Patent: Nov. 3, 2026

(54) ELECTRIC JUNCTION BOX FOR VEHICLE

(71) Applicant: YAZAKI CORPORATION, Tokyo (JP)

(72) Inventors: Hayato Yamaguchi, Makinohara (JP); Sadaharu Okuda, Makinohara (JP); Taku Furuta, Makinohara (JP); Junya Kato, Makinohara (JP); Ryoichi Murata, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 260 days.

(21) Appl. No.: 18/912,515

(22) Filed: Oct. 10, 2024

(65) Prior Publication Data

US 2025/0038502 A1 Jan. 30, 2025

Related U.S. Application Data

(63) Continuation of application No. PCT/JP2023/035034, filed on Sep. 26, 2023.

(30) Foreign Application Priority Data

Sep. 27, 2022 (JP) ................................ 2022-154024

(51) Int. Cl.
*B60R 16/033* (2006.01)
*B60R 16/023* (2006.01)
*H02G 3/08* (2006.01)

(52) U.S. Cl.
CPC ......... *H02G 3/081* (2013.01); *B60R 16/0238* (2013.01); *B60R 16/033* (2013.01)

(58) Field of Classification Search
CPC ..................................................... B60R 16/03
See application file for complete search history.

(56) References Cited

U.S. PATENT DOCUMENTS

2003/0032308 A1* 2/2003 Tamai ...................... H02J 1/08 439/34
2013/0066519 A1* 3/2013 Yoshikawa ............... B60L 1/00 713/323

FOREIGN PATENT DOCUMENTS

| | | | |
|---|---|---|---|
| JP | H9-275635 | A | 10/1997 |
| JP | 2012-152003 | A | 8/2012 |
| JP | 2018-38116 | A | 3/2018 |
| JP | 2019-193435 | A | 10/2019 |
| JP | 2017-163736 | A | 12/2020 |

* cited by examiner

*Primary Examiner* — Sherman Ng
(74) *Attorney, Agent, or Firm* — KENEALY VAIDYA LLP

(57) ABSTRACT

An electric junction box is equipped with a special simplified power supply. An internal circuit of the electric junction box supplies the output of the simplified power supply as an operating voltage of a DC/DC converter to start the DC/DC converter when battery exhaustion occurs in the low voltage battery. When the DC/DC converter is started, high voltage power stored in a high voltage battery on the vehicle can be stepped down and supplied to a circuit on the low voltage battery, thereby enabling normal starting operations such as starting an engine. An emergency start mode can be selected by a switch operation of a user or by automatic detection of a drop in power supply voltage.

4 Claims, 13 Drawing Sheets

ELECTRIC JUNCTION BOX FOR VEHICLE

CROSS-REFERENCE TO RELATED APPLICATIONS

This is a continuation of International Application No. PCT/JP2023/035034 filed on Sep. 26, 2023, and claims priority from Japanese Patent Application No. 2022-154024 filed on Sep. 27, 2022, the entire content of which is incorporated herein by reference.

TECHNICAL FIELD

The present invention relates to an electric junction box for a vehicle, and more particularly to a technique for preventing battery exhaustion in an in-vehicle battery.

BACKGROUND ART

For example, if a vehicle is not used for a long period of time or if an in-vehicle device such as a light or a heater is continuously used for a long time while an engine of the vehicle is turned off, electrical energy stored in an in-vehicle battery is discharged due to an influence of a dark current, a load current, or the like, and thus the battery is exhausted. Further, when the in-vehicle battery deteriorates, the battery becomes more likely to be exhausted. When the battery is exhausted, an output voltage of the in-vehicle battery is too low to directly perform normal operation of the vehicle such as starting the engine.

When the battery is exhausted, for example, the in-vehicle battery in the vehicle is replaced with a new battery. Alternatively, a rescue vehicle or a large power supply device is prepared and connected to a power supply circuit of a target vehicle via a prescribed booster cable, and the engine of the target vehicle is started using a technique called a jump start.

Further, for example, Patent Literature 1 discloses a technique for a jump starter that can start an engine by storing power drawn out from a battery with a low residual voltage value and discharging the power in a short period of time.

CITATION LIST

Patent Literature

Patent Literature 1: JP2018-38116A

SUMMARY OF INVENTION

However, the battery of the vehicle may be exhausted in a place where it is difficult to prepare a rescue vehicle or a large power supply device, such as a mountainous area. Therefore, even when the engine is started by the jump start technique, a user of the vehicle cannot operate himself or herself and has to request assistance from a load service or the like for rescue operation. Therefore, it takes time and effort to start the engine of the vehicle with an exhausted battery.

On the other hand, an electric vehicle (xEV) such as a pure electric automobile or a plug-in hybrid vehicle may be equipped with both a high voltage battery and a low voltage battery for driving. Power output from the low voltage battery is necessary, for example, as a power supply of various electronic control units (ECUs) and a power supply of various auxiliary devices (electrical components such as lamps, heaters, and electric motors).

The electric vehicle are often equipped with a DC/DC converter to enable a part of power stored in the high voltage battery to be supplied to a circuit on a low voltage battery side. That is, the high voltage power stored in the high voltage battery can be converted into a low voltage by the DC/DC converter and supplied to the circuit on the low voltage battery side.

However, in an electric vehicle equipped with both a high voltage battery and a low voltage battery, operation of the vehicle such as starting an engine is not possible when a battery on the low voltage battery side is exhausted. In this case, a circuit of the DC/DC converter cannot be started even if the high voltage battery has stored a sufficiently large amount of power, and thus power on a high voltage battery side cannot be supplied to the low voltage battery side. Accordingly, the jump start technique is required to start the vehicle with an exhausted battery, which takes time and effort.

The present invention is made in view of the above-described circumstances, and an object of the present invention is to provide an electric junction box for a vehicle which is useful for facilitating the start of a vehicle when battery exhaustion occurs in a low voltage battery in the vehicle.

In order to achieve the above object, an electric junction box for a vehicle according to the present invention is characterized by the following.

An electric junction box for a vehicle, including:

a junction box housing;

a low-voltage power supply input terminal provided in the junction box housing and configured to receive output power from a low voltage battery mounted on a vehicle;

one or more low-voltage load output terminals provided in the junction box housing and configured to supply, to an in-vehicle device mounted on the vehicle, power supply power generated based on power supplied to at least the low-voltage power supply input terminal;

an operating voltage output terminal provided in the junction box housing and configured to supply, to a prescribed voltage converter, an operating voltage required for the voltage converter to operate at least at a start of the vehicle;

an auxiliary power supply provided in the junction box housing; and a switch circuit provided in the junction box housing and configured to selectively switch between first power supplied to the low-voltage power supply input terminal and second power output from the auxiliary power supply to generate the operating voltage at least at a start of the vehicle.

The junction box housing has an external switch terminal.

The external switch terminal includes a first circuit for an output of the auxiliary power supply, a second circuit connected to the low voltage battery, and a third circuit connected to a battery line connection terminal of the voltage converter and a control unit for controlling starting of the voltage converter.

The electric junction box for a vehicle further includes an ignition relay circuit configured to switch between opening and closing of a connection between a battery power supply line connected to the low-voltage power supply input terminal and an ignition input power supply line, the opening and closing of the connection being controlled by the control unit.

The switch circuit selectively switches a connect destination of an ignition line connection terminal of the voltage to either the third circuit or the ignition input power supply line, and a selection state switched by the switch circuit state is automatically switched according to whether a voltage is applied to the third line.

In a vehicle equipped with the electric junction box for a vehicle according to the present invention, when battery exhaustion occurs in a low voltage battery, power supplied from an auxiliary power supply prepared in advance can be output as an operating voltage required for starting a voltage converter. After the voltage converter is started, power stored in a high voltage battery can be stepped down by the voltage converter and supplied to a low voltage battery side, so that an engine and the like of the vehicle can be started in the same way as in normal operation. Accordingly, it is not necessary for a user to perform troublesome and time-consuming work such as a jump start. In addition, power necessary required to start the voltage converter is relatively small, and thus a relatively small battery or the like can be used as the auxiliary power supply.

The present invention is briefly described above. Details of the present invention can be clarified by reading modes (hereinafter, referred to as "embodiments") for carrying out the invention to be described below with reference to the accompanying drawings.

DESCRIPTION OF EMBODIMENTS

A specific embodiment of the present invention will be described below with reference to the drawings.

Figure 1:
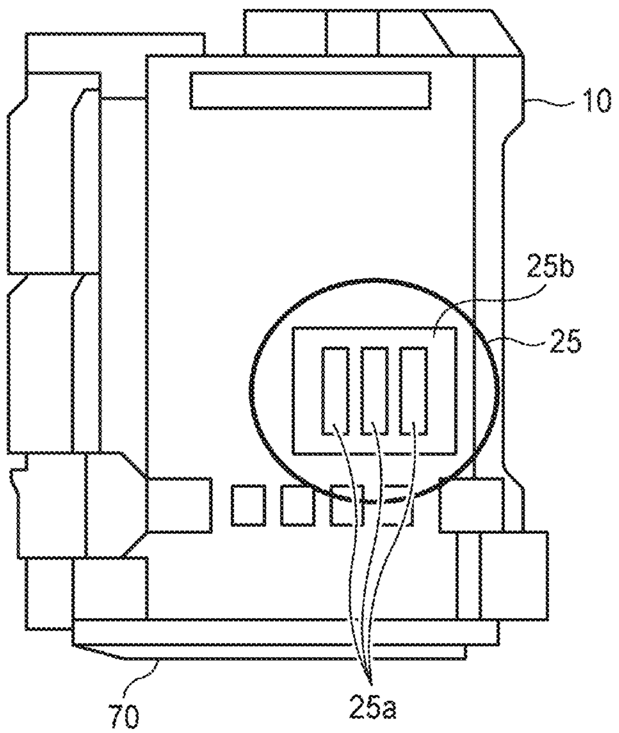
FIG. 1 is a perspective view showing an external appearance of an electric junction box.

FIG. 1 is a perspective view showing an external appearance of an electric junction box 10. The electric junction box 10 corresponds to an electric junction box for a vehicle according to the present invention.

The electric junction box 10 basically has a function of connecting a load and an upstream power supply such as an in-vehicle battery, and distributing power supply power to supply the power to the load. The electric junction box 10 is a component corresponding to a junction block (J/B) or a relay box (R/B) mounted on a general vehicle, but also includes components specific to the present embodiment, which will be described later.

The electric junction box 10 is provided with a simplified power supply 25 exposed outside a housing 70. The simplified power supply 25 includes a plurality of dry batteries **25*a* mounted in a socket of a battery case 25*b*. The battery case 25*b* is fixed to the housing 70, and each dry battery 25*a*** is detachably attached to the socket.

The plurality of dry batteries **25*a* mounted in the battery case 25*b* are connected in series in an internal circuit of the simplified power supply 25**, and configured to output a prescribed DC voltage, for example, a voltage of +12 [V].

<Configuration of Power Supply Control System>

Figure 2:
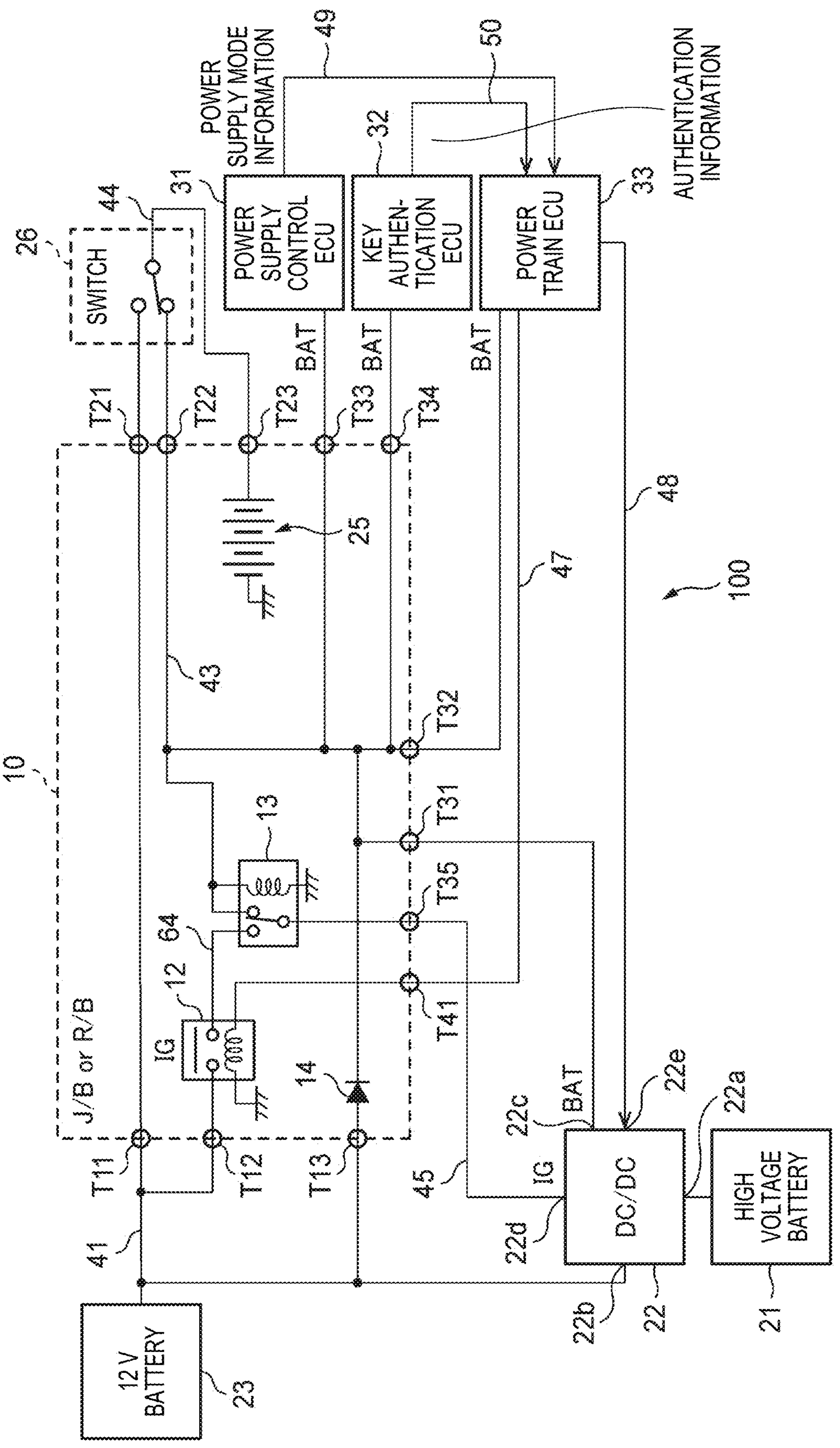
FIG. 2 is an electric circuit diagram showing a configuration of a power supply control system including the electric junction box.

FIG. 2 is an electric circuit diagram showing a configuration of a power supply control system 100 including the electric junction box 10.

The power supply control system 100 is assumed to be mounted in an electric vehicle such as a pure electric automobile or a plug-in hybrid vehicle. The electric vehicle mounted with the power supply control system 100 includes a high voltage battery 21, a low voltage battery 23, and a DC/DC converter 22 as in-vehicle power supply devices, as shown in FIG. 2.

The high voltage battery 21 can store a large amount of power necessary for the vehicle to travel, and can supply power supply power necessary for a load such as an electric motor for traveling. The high voltage battery 21 stores high voltage power of, for example, about hundreds of volts [V]. By handling the high voltage, power loss that occurs in a power distribution path, a load, and the like of a traveling system can be reduced.

The low voltage battery 23 stores low voltage power of, for example, about +12 [V], and can supply power supply power necessary for various loads of a low voltage system. Loads such as various electronic control units (ECUs), lamps, heaters, and low voltage electric motors operate at a low voltage, and thus power loss can be reduced by supplying power supply power of an appropriate voltage from an output of the low voltage battery 23.

The direct current (DC)/DC converter 22 steps down high voltage DC power on a high voltage battery 21 side to generate low voltage DC power that can be used on a low voltage battery 23 side. The DC/DC converter 22 performs switching in synchronization with, for example, a prescribed pulse signal therein. By appropriately adjusting a duty or the like of the pulse signal, power conversion from a high voltage to a desired low voltage can be performed with high efficiency.

In order for the DC/DC converter 22 to operate, power supply power supplied from an external power supply is essential. For example, when the DC/DC converter 22 operates by power supply power supplied from the low voltage battery 23, unless some special measure is taken, there is a high probability that the DC/DC converter 22 does not start operating when battery exhaustion occurs in the low voltage battery 23.

The DC/DC converter 22 shown in FIG. 2 includes a high-voltage side input terminal **22*a*, a low-voltage side output terminal 22*b*, a battery (BAT) line connection terminal 22*c*, an ignition (IG) line connection terminal 22*d*, and a control input terminal 22*e***.

As shown in FIG. 2, the high-voltage side input terminal **22*a* of the DC/DC converter 22 is connected to an output of the high voltage battery 21, the low-voltage side output terminal 22*b* is connected to a battery power supply line 41, and the battery power supply line 41 is connected to the low voltage battery 23. The BAT line connection terminal 22***c* is connected to a load side power supply line 43, the IG line connection terminal 22*d* is connected to an IG output power supply line 45, and the control input terminal 22*e* is connected to a control line 48.

In addition to the high voltage battery 21, the DC/DC converter 22, and the low voltage battery 23, main components of the power supply control system 100 include the electric junction box 10, a mode switch 26, a power supply control ECU 31, a key authentication ECU 32, and a power train ECU 33.

The electric junction box 10 has terminals T11 to T13, T21 to T23, T31 to T35, and T41 for connection to an external circuit. The terminals T11 to T13 are connected to the battery power supply line 41. The terminals T21 to T23 are connected to the mode switch 26.

Further, the terminals T31, T32, T33, and T34 of the electric junction box 10 are connected to respective BAT power supply input terminals of the DC/DC converter 22, the power train ECU 33, the power supply control ECU 31, and the key authentication ECU 32, which are loads. The terminal T35 of the electric junction box 10 is connected to the IG line connection terminal 22*d* of the DC/DC converter 22 via the IG output power supply line 45. The terminal T41 is connected to the control output of the power train ECU 33 via an IG control line 47.

The mode switch 26 is a special manually operated switch disposed in a position (for example, below an instrument panel) where a driver of the vehicle can operate it, and can select either an emergency start mode or a normal mode. When battery exhaustion occurs in the low voltage battery 23, the user selects the emergency start mode with the mode switch 26, so that the vehicle can be started using power supply power from the simplified power supply 25.

As shown in FIG. 2, a normal mode terminal, an emergency start mode terminal, and a common terminal of the mode switch 26 are respectively connected to the terminals T21, T22, and T23 of the electric junction box 10. In practice, the mode switch 26 and the electric junction box 10 are connected via a wire harness including a switch common line 44.

The power supply control ECU 31 has a function of instructing each circuit of an accessory (ACC) system and an IG system to supply power. The key authentication ECU 32 has a function of authenticating a key necessary for driving the vehicle. The power train ECU 33 has a function of controlling the DC/DC converter 22.

The electric junction box 10 incorporates an IG relay 12, a path switching relay 13, and a backflow prevention element 14 in addition to the simplified power supply 25 shown in FIG. 1.

The IG relay 12 has an electric coil for driving a contact and one electric contact. One terminal of the electric contact of the IG relay 12 is connected to the battery power supply line 41, and the other terminal is connected to an IG input power supply line 64.

The electric coil of the IG relay 12 has one terminal connected to the IG control line 47 and the other terminal connected to ground (earth). The IG control line 47 is connected to an output of the power train ECU 33. The electric contact of the IG relay 12 can switch between opening and closing of the connection between the battery power supply line 41 and the IG input power supply line 64 according to a signal of the IG control line 47. This opening and closing control is performed by the power train ECU 33.

The path switching relay 13 includes a switch having an electric coil for driving a contact and two electric contacts that can be selectively connected. An electric coil of the path switching relay 13 has one terminal connected to the load side power supply line 43 and the other terminal connected to ground.

The switch of the path switching relay 13 can selectively connect a terminal connected to the IG output power supply line 45 to either a contact of the IG input power supply line 64 or a contact of the load side power supply line 43. Since the electric coil of the path switching relay 13 is connected to the load side power supply line 43, a selection state of the switch of the path switching relay 13 is automatically switched according to whether a voltage is applied to the load side power supply line 43.

That is, when a prescribed voltage is applied to the load side power supply line 43, the switch of the path switching relay 13 connects the load side power supply line 43 and the IG output power supply line 45. When a prescribed voltage is not applied to the load side power supply line 43, the switch of the path switching relay 13 connects the IG input power supply line 64 and the IG output power supply line 45.

The backflow prevention element 14 is implemented by a diode, and allows a current to pass in a direction from the battery power supply line 41 toward the load side power supply line 43, and prevents a current from passing in a reverse direction. That is, only when a voltage of the battery power supply line 41 is higher than that of the load side power supply line 43, a current flows from the battery power supply line 41 to the load side power supply line 43.

The control line 48 connects a control output of the power train ECU 33 and the control input terminal 22*e* of the DC/DC converter 22. Accordingly, the power train ECU 33 can control the DC/DC converter 22.

A signal line 49 connects an output of the power supply control ECU 31 and an input of the power train ECU 33. The signal line 49 can input power supply mode information sent by the power supply control ECU 31 to the power train ECU 33. A signal line 50 connects an output of the key authentication ECU 32 and an input of the power train ECU 33. The signal line 50 can input authentication information sent by the key authentication ECU 32 to the power train ECU 33.

<Operation of Power Supply Control System>

Operation of the power supply control system 100 shown in FIG. 2 will be described below.

In a normal state, the mode switch 26 is in a state in which the terminal T21 and the switch common line 44 are connected to each other. When the engine or the like of the vehicle is started, the IG relay 12 connects the battery power supply line 41 and the IG input power supply line 64, and the path switching relay 13 connects the IG input power supply line 64 and the IG output power supply line 45. The low-voltage power supply power output from the low voltage battery 23 is supplied to the power supply control ECU 31, the key authentication ECU 32, the power train ECU 33, and the DC/DC converter 22 separately.

Accordingly, the vehicle can be started using the power supply power normally stored in the low voltage battery 23. When the power train ECU 33 starts the DC/DC converter 22, the high voltage power output from the high voltage battery 21 can be converted into low voltage power inside the DC/DC converter 22 and supplied from the low-voltage side output terminal 22*b* to the battery power supply line 41.

On the other hand, for example, when the vehicle which is left in a parking state for a long period of time is started or when an in-vehicle device is continuously used for a long time while the engine is turned off, battery exhaustion may occur in the low voltage battery 23. In this case, the output voltage of the low voltage battery 23 drops abnormally, and thus there is a high probability that any one of the power supply control ECU 31, the key authentication ECU 32, and the power train ECU 33 does not operate normally. Further, a voltage applied to the BAT line connection terminal 22*c* and the IG line connection terminal 22*d* of the DC/DC converter 22 drops, and thus the DC/DC converter 22 does not start up.

Accordingly, even when sufficient power is stored on the high voltage battery 21 side, the power cannot be stepped down and used on a battery power supply line 41 side. For this reason, in a case of a general vehicle that does not include the electric junction box 10 having the special function of the present invention, it is necessary to perform jump start or the like that takes time to start the engine or the like.

On the other hand, in a case of a vehicle equipped with the power supply control system 100 including the electric junction box 10 shown in FIGS. 1 and 2, the engine or the like can be easily started when battery exhaustion occurs in the low voltage battery 23.

That is, since the simplified power supply 25 is mounted on the electric junction box 10, the power supply power of the simplified power supply 25 can be used for starting. A user of a vehicle in which the battery exhaustion has occurred switches the mode switch 26 from the normal mode to the emergency start mode (state shown in FIG. 2). Accordingly, the engine or the like can be started as described below.

In this case, as shown in FIG. 2, the mode switch 26 connects the switch common line 44 and the load side power supply line 43. As a result, a prescribed DC voltage output from the simplified power supply 25 is supplied to the load side power supply line 43 via the terminal T23, the switch common line 44, the mode switch 26, and the terminal T22.

Therefore, necessary power supply power is supplied from the load side power supply line 43 to the BAT power supply input terminals of the power supply control ECU 31, the key authentication ECU 32 and the power train ECU 33, as well as the BAT line connection terminal 22*c* of the DC/DC converter 22.

Further, since the load side power supply line 43 is at a high potential, the electric coil of the path switching relay 13 is energized, and the switch in the path switching relay 13 is switched. The load side power supply line 43 and the IG output power supply line 45 are connected by the switch. Accordingly, power supply power of a sufficiently high voltage is also supplied from the IG output power supply line 45 to the IG line connection terminal 22*d* of the DC/DC converter 22.

Since the backflow prevention element 14 is provided in the configurations shown in FIG. 2, no current flows in a direction from the load side power supply line 43 toward the battery power supply line 41. Accordingly, even when the voltage of the battery power supply line 41 is abnormally low, no excessive current flows from the load side power supply line 43 to the battery power supply line 41, and a load of the simplified power supply 25 can be prevented from becoming excessive.

In this state, necessary power supply power is supplied to the BAT line connection terminal 22*c* and the IG line connection terminal 22*d* of the DC/DC converter 22. Accordingly, when the power train ECU 33 controls a signal of the control line 48, an operation of an internal circuit of the DC/DC converter 22 can be initiated.

When the DC/DC converter 22 is started, the high voltage power supplied from the high voltage battery 21 is stepped down by the internal circuit of the DC/DC converter 22, and appears on the low-voltage side output terminal 22*b* as low-voltage power supply power.

The low-voltage power supply power output to the low-voltage side output terminal 22*b* of the DC/DC converter 22 is supplied to the battery power supply line 41. Accordingly, the power stored in the high voltage battery 21 can be used to charge the low voltage battery 23. When the voltage of the battery power supply line 41 is higher than that of the load side power supply line 43, a current flows from the battery power supply line 41 to the load side power supply line 43 via the backflow prevention element 14.

That is, after operation of the internal circuit of the DC/DC converter 22 is initiated, the power supply voltage appearing on the load side power supply line 43 can be maintained sufficiently high even when the simplified power supply 25 is consumed and an output voltage thereof drops. Accordingly, the operation of the DC/DC converter 22, normal operation of the power supply control ECU 31, the key authentication ECU 32 and the power train ECU 33, and the operation of starting the engine and the like of the vehicle can be continued. Therefore, even if the simplified power supply 25 has a small size and a fairly small amount of power that can be supplied, the simplified power supply 25 can be sufficiently used as a power supply for emergency to start the vehicle.

Configuration of Modification 1

Figure 3:
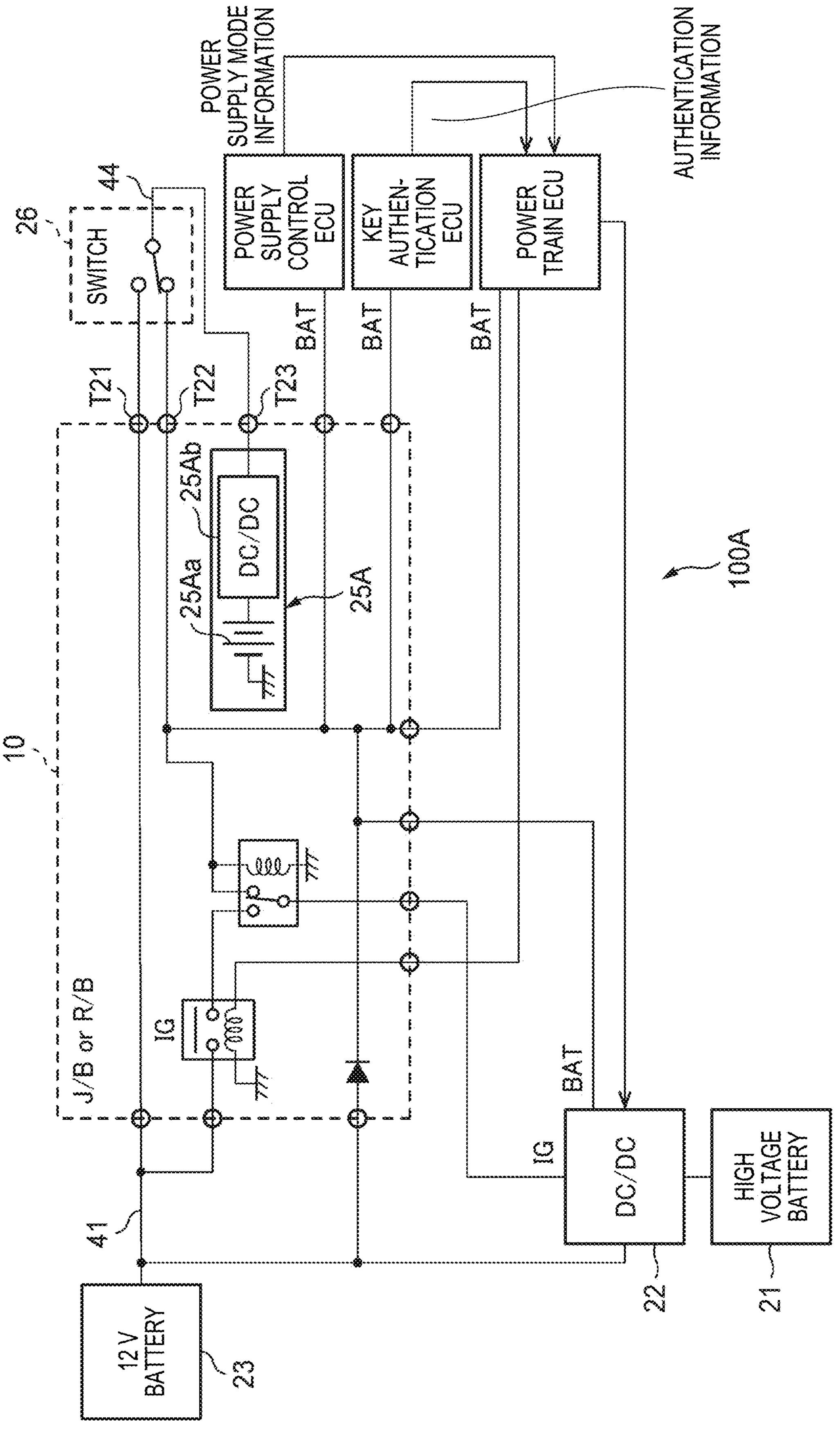
FIG. 3 is an electric circuit diagram showing a power supply control system according to Modification 1.

FIG. 3 is an electric circuit diagram showing a power supply control system 100A according to Modification 1. The configuration of the power supply control system 100A of FIG. 3 is a modification of the power supply control system 100 shown in FIG. 2.

In the power supply control system 100A shown in FIG. 3, the electric junction box 10 includes a simplified power supply 25A instead of the simplified power supply 25 in FIG. 2. Other configurations and operations of the electric junction box 10 are the same as those in the case of FIG. 2.

The simplified power supply 25A in FIG. 3 is a device in which a built-in battery 25Aa and a DC/DC converter 25Ab are integrated as a power supply module. The DC/DC converter 25Ab boosts the DC voltage output from the built-in battery 25Aa to generate a specified DC voltage (for example, +12 [V]).

As shown in FIG. 3, an output terminal on a positive side of the simplified power supply 25A is connected to the terminal T23 of the electric junction box 10, and an output terminal on a negative side of the simplified power supply 25A is connected to the ground. Therefore, the simplified power supply 25A in FIG. 3 has the same function as the simplified power supply 25 in FIG. 2.

That is, when battery exhaustion occurs in the low voltage battery 23 of the vehicle, power of the simplified power supply 25A can be supplied to a load such as the DC/DC converter 22 to start the DC/DC converter 22. When the DC/DC converter 22 is started, the power stored in the high voltage battery 21 can be stepped down and supplied to the battery power supply line 41 and the low voltage battery 23. Accordingly, it is possible to secure the power supply power necessary for starting the engine and the like without using the jump start technique.

Configuration of Modification 2

Figure 4:
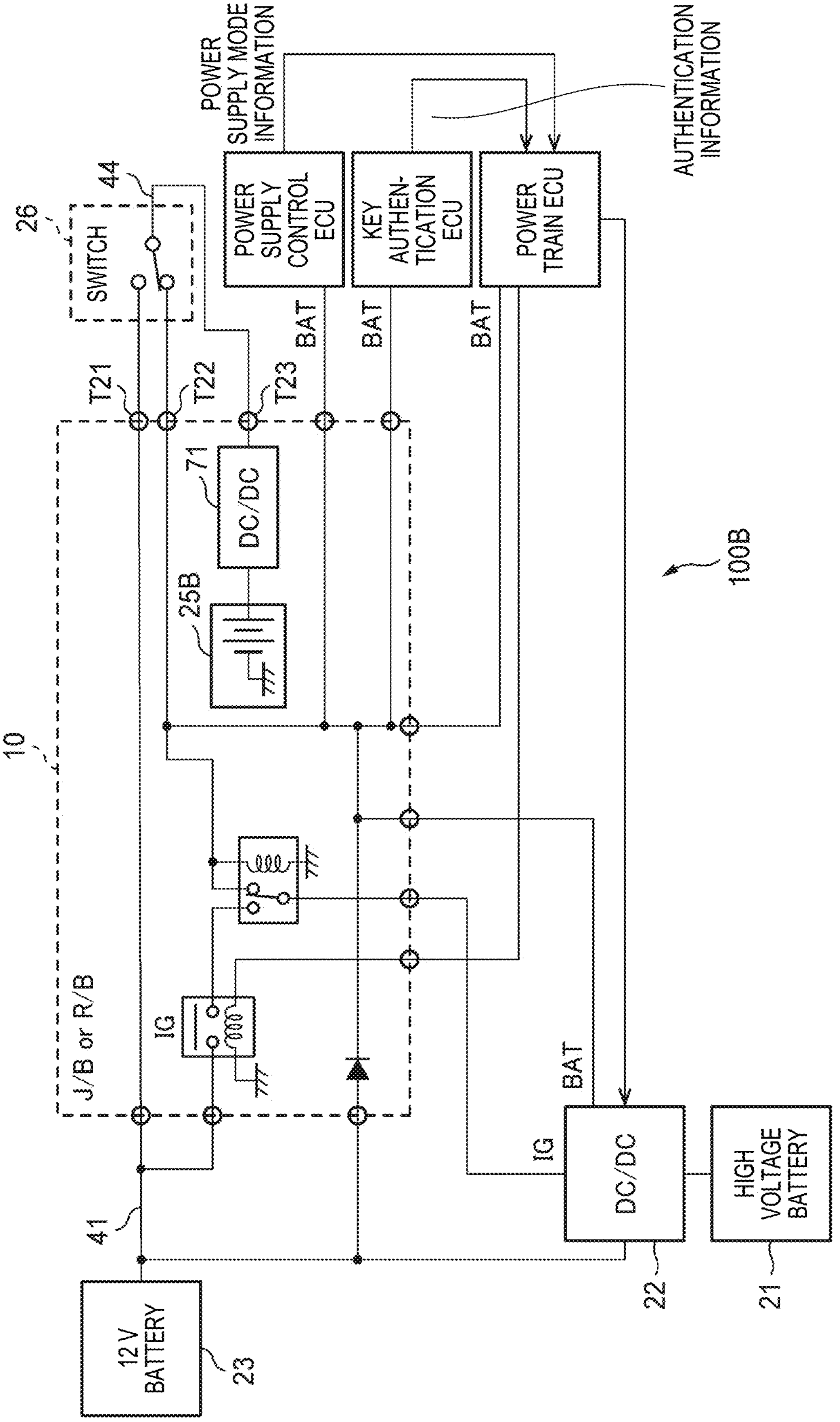
FIG. 4 is an electric circuit diagram showing a power supply control system according to Modification 2.

FIG. 4 is an electric circuit diagram showing a power supply control system according to Modification 2. The configuration of a power supply control system 100B of FIG. 4 is a modification of the power supply control system 100 shown in FIG. 2.

In the power supply control system 100B shown in FIG. 4, the electric junction box 10 includes a simplified power supply 25B instead of the simplified power supply 25 in FIG. 2, and a DC/DC converter 71. Other configurations and operations of the electric junction box 10 are the same as those in the case of FIG. 2.

The simplified power supply 25B in FIG. 4 is configured as a battery pack in which a plurality of dry batteries are combined and integrated. The output voltage of the battery pack is lower than a specified voltage (for example, +12 [V]) of the low voltage battery 23.

The DC/DC converter 71 added to the electric junction box 10 shown in FIG. 4 boosts the DC voltage output by the simplified power supply 25B to generate a specified DC voltage (for example, +12 [V]).

As shown in FIG. 4, an output terminal on a positive side of the simplified power supply 25B is connected to the input of the DC/DC converter 71, and an output terminal on a negative side of the simplified power supply 25B is connected to the ground. The output of the DC/DC converter 71 is connected to the terminal T23 of the electric junction box 10. Therefore, the simplified power supply 25B and the DC/DC converter 71 in FIG. 4 have the same function as the simplified power supply 25 in FIG. 2.

That is, when battery exhaustion occurs in the low voltage battery 23 of the vehicle, the power output by the simplified power supply 25B can be boosted by the DC/DC converter 71 and supplied to a load such as the DC/DC converter 22 to start the DC/DC converter 22. When the DC/DC converter 22 is started, the power stored in the high voltage battery 21 can be stepped down and supplied to the battery power supply line 41 and the low voltage battery 23. Accordingly, it is possible to secure the power supply power necessary for starting the engine and the like without using the jump start technique.

Configuration of Modification 3

Figure 5:
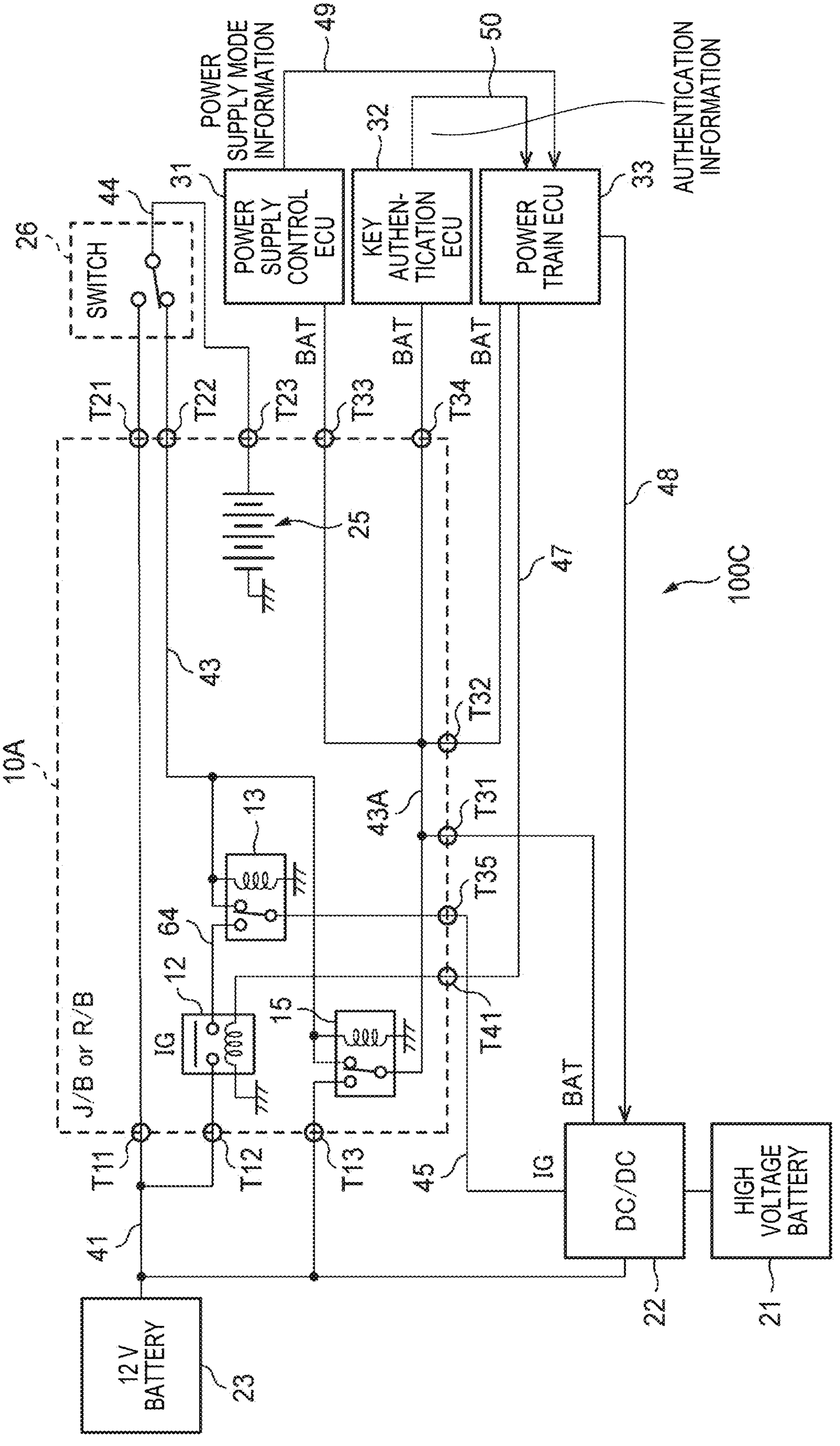
FIG. 5 is an electric circuit diagram showing a power supply control system according to Modification 3.

FIG. 5 is an electric circuit diagram showing a power supply control system 100C according to Modification 1. The configuration of a power supply control system 100C of FIG. 5 is a modification of the power supply control system 100 shown in FIG. 2.

An electric junction box 10A of the power supply control system 100C shown in FIG. 5 includes a path switching relay 15 instead of the backflow prevention element 14 shown in FIG. 2. The path switching relay 15 includes a switch having an electric coil for driving a contact and two electric contacts that can be selectively connected. An electric coil of the path switching relay 15 has one terminal connected to the load side power supply line 43 and the other terminal connected to ground.

A switch of the path switching relay 15 can selectively connect a terminal connected to a load side power supply line 43A to either a contact of the battery power supply line 41 or a contact of the load side power supply line 43. Since the electric coil of the path switching relay 15 is connected to the load side power supply line 43, a selection state of the switch of the path switching relay 15 is automatically switched according to whether a voltage is applied to the load side power supply line 43.

The BAT line connection terminal 22*c* of the DC/DC converter 22 and respective BAT power supply input terminals of the power supply control ECU 31, the key authentication ECU 32 and the power train ECU 33 are each connected to the load side power supply line 43A.

When a prescribed voltage is applied to the load side power supply line 43, the switch of the path switching relay 15 connects the load side power supply line 43 and the load side power supply line 43A. When a prescribed voltage is not applied to the load side power supply line 43, the switch of the path switching relay 15 connects the battery power supply line 41 and the load side power supply line 43A.

That is, the path switching relay 15 can automatically switch a path of a supply source of a power supply power for a BAT system of the DC/DC converter 22, the power supply control ECU 31, the key authentication ECU 32, and the power train ECU 33.

Operation of Modification 3

Operation of the power supply control system 100C shown in FIG. 5 will be described below.

For example, when battery exhaustion occurs in the low voltage battery 23, a user operates the mode switch 26 to switch from the normal mode to the emergency start mode (state shown in FIG. 5). Accordingly, the engine or the like can be started as described below.

In this case, as shown in FIG. 5, the mode switch 26 connects the switch common line 44 and the load side power supply line 43. As a result, a prescribed DC voltage (for example, +12 [V]) output from the simplified power supply 25 is supplied to the load side power supply line 43 via the terminal T23, the switch common line 44, the mode switch 26, and the terminal T22.

Accordingly, the electric coil of the path switching relay 13 is energized, and the switch of the path switching relay 13 connects the load side power supply line 43 and the IG output power supply line 45. Further, the electric coil of the path switching relay 15 is energized, and the switch of the path switching relay 15 connects the load side power supply line 43 and the load side power supply line 43A.

Accordingly, power supply power from the simplified power supply 25 is supplied to the BAT line connection terminal 22*c* and the IG line connection terminal 22*d* of the DC/DC converter 22, and to the respective BAT power supply input terminals of the power supply control ECU 31, the key authentication ECU 32, and the power train ECU 33.

In this state, necessary power supply power is supplied to the BAT line connection terminal 22*c* and the IG line connection terminal 22*d* of the DC/DC converter 22. Accordingly, when the power train ECU 33 controls the signal of the control line 48, the internal circuit of the DC/DC converter 22 can be initiated.

When the DC/DC converter 22 is started, the high voltage power supplied from the high voltage battery 21 is stepped down by the internal circuit of the DC/DC converter 22, and appears on the low-voltage side output terminal 22*b* as low-voltage power supply power.

The low-voltage power supply power output to the low-voltage side output terminal 22*b* of the DC/DC converter 22 is supplied to the battery power supply line 41. Accordingly, the power stored in the high voltage battery 21 can be used to charge the low voltage battery 23.

When the engine or the like of the vehicle successfully starts up and the user switches the mode switch 26 to the normal mode, or when the output voltage of the simplified power supply 25 drops, the load side power supply line 43 is at a low potential. Accordingly, energization of the electric coil of the path switching relay 13 and the electric coil of the path switching relay 15 is stopped. Accordingly, the switch of the path switching relay 13 is switched to a state of connecting the IG input power supply line 64 and the IG output power supply line 45, and the switch of the path switching relay 15 is switched to a state of connecting the battery power supply line 41 and the load side power supply line 43A.

Accordingly, supply of power supply power to the IG line connection terminal 22*d* of the DC/DC converter 22 can be continued through a path passing through the battery power supply line 41, the IG relay 12, the path switching relay 13, and the IG output power supply line 45. Further, supply of power supply power to the BAT line connection terminal 22*c* of the DC/DC converter 22 and the respective BAT power supply input terminals of the power supply control ECU 31, the key authentication ECU 32, and the power train ECU 33 can be continued through a path passing through the battery power supply line 41, the path switching relay 15, and the load side power supply line 43A.

That is, when the engine or the like of the vehicle cannot start up due to the battery exhaustion of the low voltage battery 23, as long as sufficient power supply power can be supplied from the simplified power supply 25 just until the internal circuit of the DC/DC converter 22 starts up, the power supply power stored in the high voltage battery 21 side can be used thereafter, and thus the engine or the like can easily start up. Therefore, even if the simplified power supply 25 has a small size and a fairly small amount of power that can be supplied, the simplified power supply 25 can be sufficiently used as a power supply for emergency to start the vehicle.

Configuration of Modification 4

Figure 6:
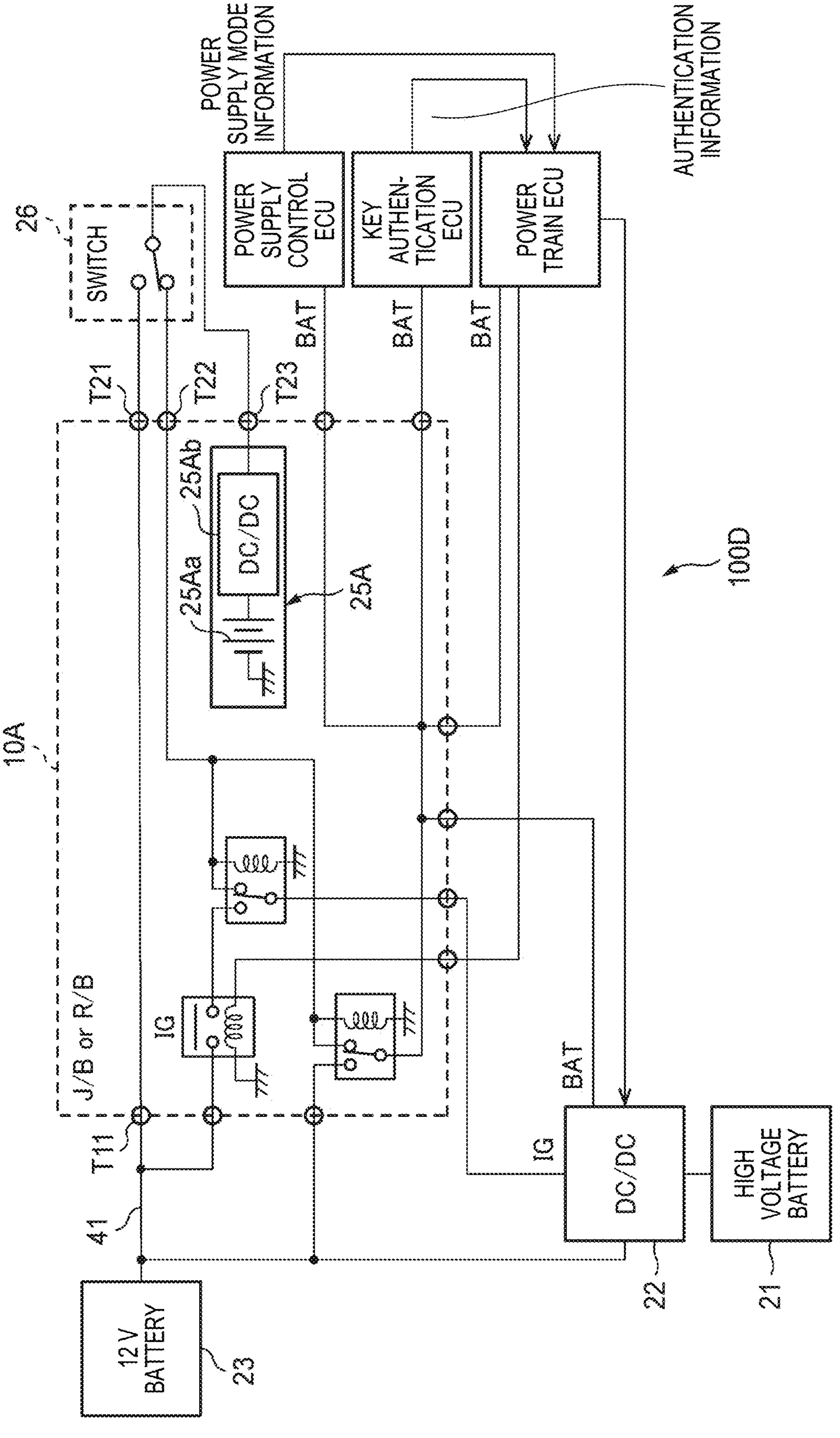
FIG. 6 is an electric circuit diagram showing a power supply control system according to Modification 4.

FIG. 6 is an electric circuit diagram showing a power supply control system 100D according to Modification 4. The configuration of the power supply control system 100D of FIG. 6 is a modification of the power supply control system 100C shown in FIG. 5.

In the power supply control system 100D shown in FIG. 6, the electric junction box 10A includes a simplified power supply 25A instead of the simplified power supply 25 in FIG. 5. Other configurations and operations of the electric junction box 10A are the same as those in the case of FIG. 5.

The simplified power supply 25A is a device in which the built-in battery 25Aa and the DC/DC converter 25Ab are integrated as a power supply module. The DC/DC converter 25Ab boosts the DC voltage output from the built-in battery 25Aa to generate a specified DC voltage (for example, +12 [V]).

As shown in FIG. 6, the output terminal on the positive side of the simplified power supply 25A is connected to the terminal T23 of the electric junction box 10A, and the output terminal on the negative side of the simplified power supply 25A is connected to the ground. Therefore, the simplified power supply 25A in FIG. 6 has the same function as the simplified power supply 25 in FIG. 5.

That is, when battery exhaustion occurs in the low voltage battery 23 of the vehicle, power of the simplified power supply 25A can be supplied to a load such as the DC/DC converter 22 to start the DC/DC converter 22. When the DC/DC converter 22 is started, the power stored in the high voltage battery 21 can be stepped down and supplied to the battery power supply line 41 and the low voltage battery 23. Accordingly, it is possible to secure the power supply power necessary for starting the engine and the like without using the jump start technique.

Configuration of Modification 5

Figure 7:
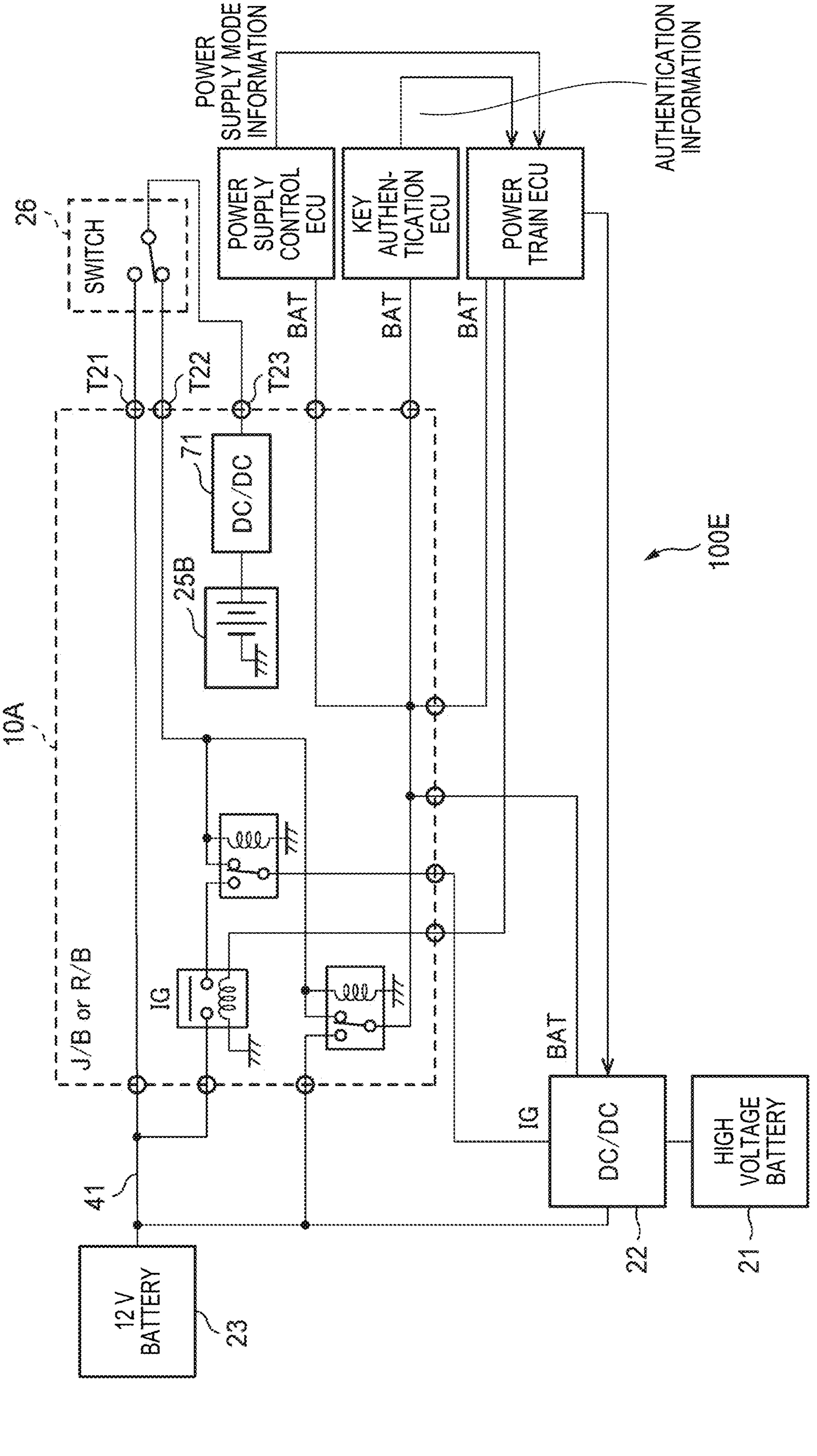
FIG. 7 is an electric circuit diagram showing a power supply control system according to Modification 5.

FIG. 7 is an electric circuit diagram showing a power supply control system 100E according to Modification 5. The configuration of the power supply control system 100E of FIG. 7 is a modification of the power supply control system 100C shown in FIG. 5.

In the power supply control system 100E shown in FIG. 7, the electric junction box 10A includes the simplified power supply 25B instead of the simplified power supply 25 in FIG. 5, and the DC/DC converter 71. Other configurations and operations of the electric junction box 10A are the same as those in the case of FIG. 5.

The simplified power supply 25B in FIG. 7 is configured as a battery pack in which a plurality of dry batteries are combined and integrated. The output voltage of the battery pack is lower than a specified voltage (for example, +12 [V]) of the low voltage battery 23.

The DC/DC converter 71 added to the electric junction box 10A shown in FIG. 7 boosts the DC voltage output by the simplified power supply 25B to generate a specified DC voltage (for example, +12 [V]).

As shown in FIG. 7, the output terminal on the positive side of the simplified power supply 25B is connected to the input of the DC/DC converter 71, and the output terminal on the negative side of the simplified power supply 25B is connected to the ground. The output of the DC/DC converter 71 is connected to the terminal T23 of the electric junction box 10. Therefore, the simplified power supply 25B and the DC/DC converter 71 in FIG. 7 have the same function as the simplified power supply 25 in FIG. 5.

That is, when battery exhaustion occurs in the low voltage battery 23 of the vehicle, the power output by the simplified power supply 25B can be boosted by the DC/DC converter 71 and supplied to a load such as the DC/DC converter 22 to start the DC/DC converter 22. When the DC/DC converter 22 is started, the power stored in the high voltage battery 21 can be stepped down and supplied to the battery power supply line 41 and the low voltage battery 23. Accordingly, it is possible to secure the power supply power necessary for starting the engine and the like without using the jump start technique.

Configuration of Modification 6

Figure 8:
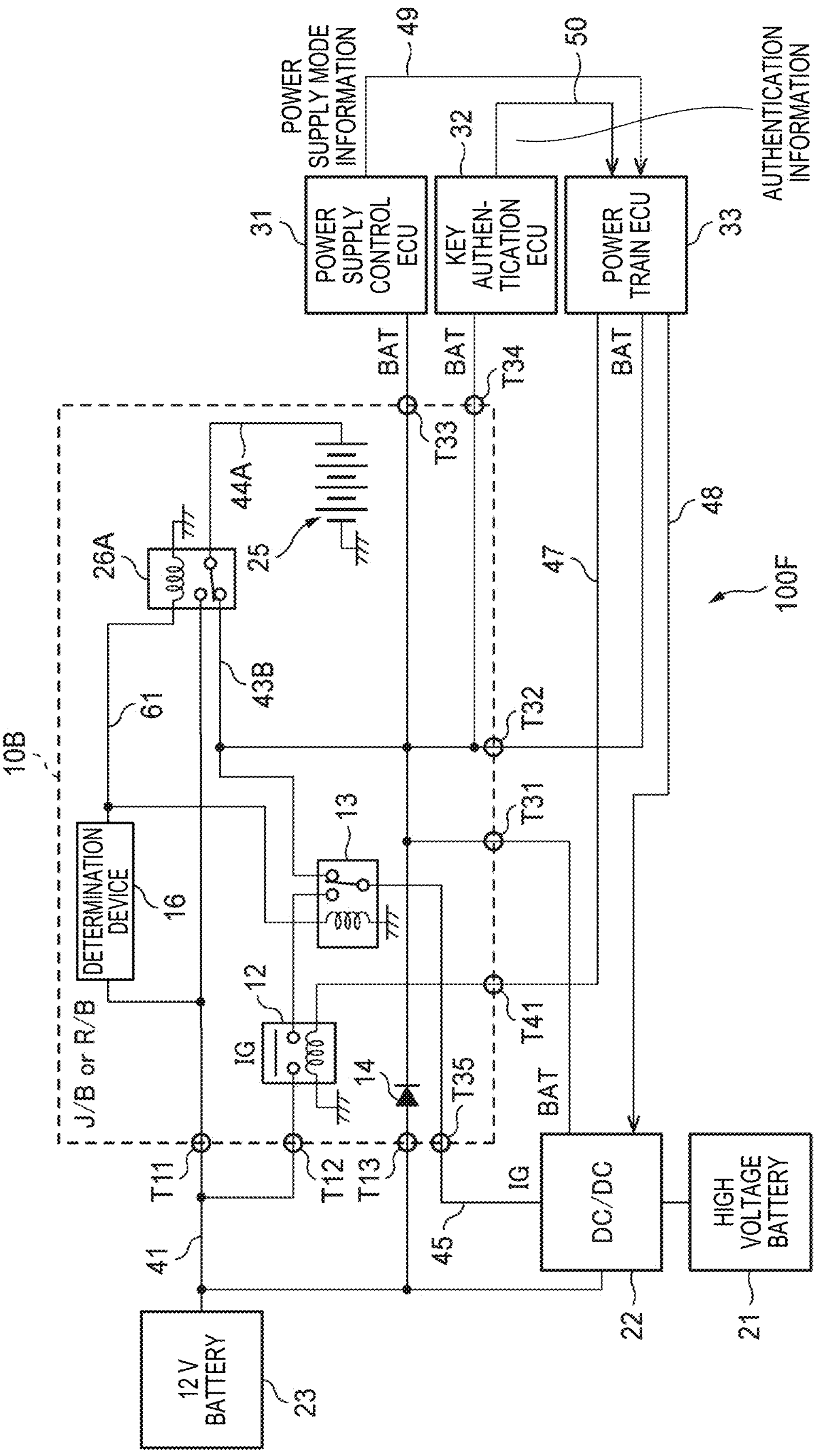
FIG. 8 is an electric circuit diagram showing a power supply control system according to Modification 6.

FIG. 8 is an electric circuit diagram showing a power supply control system 100F according to Modification 6. The power supply control system 100F of FIG. 8 is a modification of the power supply control system 100 of FIG. 2.

In the power supply control system 100F of FIG. 8, a mode switching relay 26A instead of the mode switch 26 shown in FIG. 2 is built into an electric junction box 10B, and a determination device 16 is further added to the electric junction box 10B.

As shown in FIG. 8, the determination device 16 has an input terminal connected to the battery power supply line 41 and an output terminal connected to one end of the electric coil of the path switching relay 13 and one end of an electric coil of the mode switching relay 26A via a mode control line 61.

The determination device 16 monitors a voltage of the battery power supply line 41 and outputs a signal indicating presence or absence of battery exhaustion. The signal is applied to the electric coil of the path switching relay 13 and the electric coil of the mode switching relay 26A to switch states of switches of the path switching relay 13 and the mode switching relay 26A.

The mode switching relay 26A includes a switch having an electric coil for driving a contact and two electric contacts that can be selectively connected. The electric coil of the mode switching relay 26A has one terminal connected to the mode control line 61 and the other terminal connected to the ground.

The switch of the mode switching relay 26A selectively connects a terminal connected to the switch common line 44A to either a contact of the battery power supply line 41 or a contact of the load side power supply line 43B, and selects either the emergency start mode or the normal mode described above. A state shown in FIG. 8 is a selection state of the emergency start mode.

Configurations of the power supply control system 100F other than the above are the same as those of the power supply control system 100 of FIG. 2.

Operation of Modification 6

Operation of the power supply control system 100F shown in FIG. 8 will be described below.

When the battery exhaustion occurs in the low voltage battery 23, the determination device 16 in the electric junction box 10B detects a voltage drop in the battery power supply line 41 and outputs a signal to the mode control line 61 to automatically control a selection state of the mode switching relay 26A and the path switching relay 13. Accordingly, as shown in FIG. 8, the switch of the mode switching relay 26A connects the switch common line 44A and the load side power supply line 43B, and the path switching relay 13 connects the load side power supply line 43B and the IG output power supply line 45. This is the emergency start mode.

Accordingly, the prescribed DC voltage output from the simplified power supply 25 is supplied to the load side power supply line 43B via the switch common line 44A and the mode switching relay 26A.

Therefore, necessary power supply power is supplied from the load side power supply line 43B to the BAT power supply input terminals of the power supply control ECU 31, the key authentication ECU 32 and the power train ECU 33, as well as the BAT line connection terminal 22*c* of the DC/DC converter 22. Further, necessary power supply power is also supplied from the load side power supply line 43B to the IG line connection terminal 22*d* of the DC/DC converter 22 via the path switching relay 13 and the IG output power supply line 45.

Since the backflow prevention element 14 is provided in the configurations shown in FIG. 8, no current flows in a direction from the load side power supply line 43B toward the battery power supply line 41. Accordingly, even when the voltage of the battery power supply line 41 is abnormally low, no excessive current flows from the load side power supply line 43B to the battery power supply line 41, and a load of the simplified power supply 25 can be prevented from becoming excessive.

In this state, necessary power supply power is supplied to the BAT line connection terminal 22*c* and the IG line connection terminal 22*d* of the DC/DC converter 22. Accordingly, when the power train ECU 33 controls a signal of the control line 48, an operation of an internal circuit of the DC/DC converter 22 can be initiated.

When the DC/DC converter 22 is started, the high voltage power supplied from the high voltage battery 21 is stepped down by the internal circuit of the DC/DC converter 22, and appears on the low-voltage side output terminal 22*b* as low-voltage power supply power.

The low-voltage power supply power output to the low-voltage side output terminal 22*b* of the DC/DC converter 22 is supplied to the battery power supply line 41. Accordingly, the power stored in the high voltage battery 21 can be used to charge the low voltage battery 23. When the voltage of the battery power supply line 41 is higher than that of the load side power supply line 43B, a current flows from the battery power supply line 41 to the load side power supply line 43B via the backflow prevention element 14.

That is, after operation of the internal circuit of the DC/DC converter 22 is initiated, the power supply voltage appearing on the load side power supply line 43B can be maintained sufficiently high even when the simplified power supply 25 is consumed and an output voltage thereof drops. Accordingly, the operation of the DC/DC converter 22, normal operation of the power supply control ECU 31, the key authentication ECU 32 and the power train ECU 33, and the operation of starting the engine and the like of the vehicle can be continued. Therefore, even if the simplified power supply 25 has a small size and a fairly small amount of power that can be supplied, the simplified power supply 25 can be sufficiently used as a power supply for emergency to start the vehicle.

When the battery exhaustion in the low voltage battery 23 is resolved and the battery power supply line 41 has a sufficiently high voltage, the determination device 16 detects this change and switches a signal to be output to the mode control line 61. Accordingly, the switch of the mode switching relay 26A is switched to a state of connecting the switch common line 44A and the battery power supply line 41, and the path switching relay 13 is switched to a state of connecting the IG input power supply line 64 and the IG output power supply line 45.

Configuration of Modification 7

Figure 9:
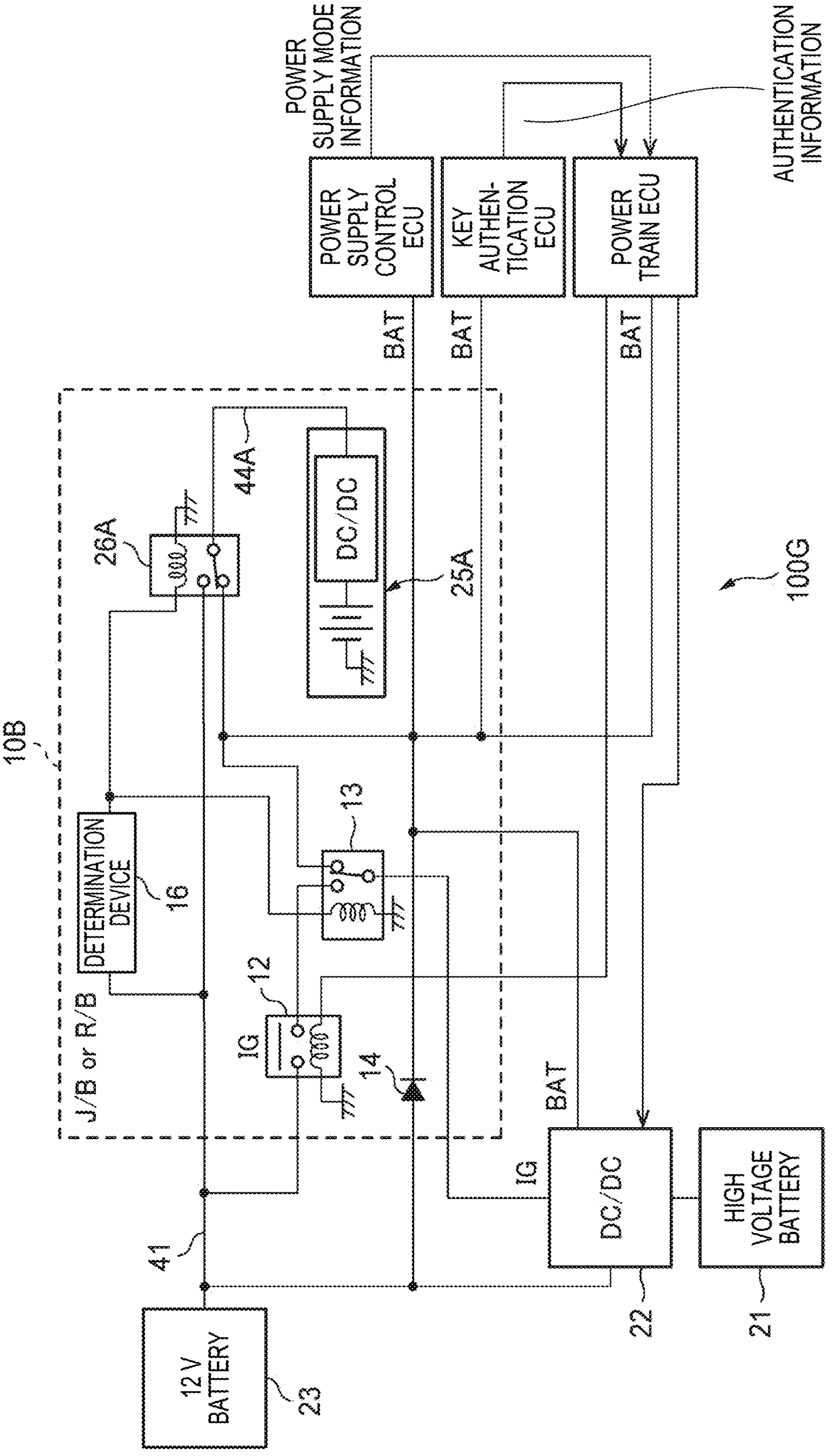
FIG. 9 is an electric circuit diagram showing a power supply control system according to Modification 7.

FIG. 9 is an electric circuit diagram showing a power supply control system 100G according to Modification 7. The configuration of the power supply control system 100G of FIG. 9 is a modification of the power supply control system 100F of FIG. 8.

In the power supply control system 100G shown in FIG. 9, the electric junction box 10B includes the simplified power supply 25A instead of the simplified power supply 25 in FIG. 8. Other configurations and operations of the electric junction box 10B are the same as those in the case of FIG. 8.

The simplified power supply 25A in FIG. 9 is a device in which the built-in battery 25Aa and the DC/DC converter 25Ab are integrated as a power supply module. The DC/DC converter 25Ab boosts the DC voltage output from the built-in battery 25Aa to generate a specified DC voltage (for example, +12 [V]).

As shown in FIG. 9, the output terminal on the positive side of the simplified power supply 25A is connected to the terminal T23 of the electric junction box 10B, and the output terminal on the negative side of the simplified power supply 25A is connected to the ground. Therefore, the simplified power supply 25A in FIG. 9 has the same function as the simplified power supply 25 in FIG. 8.

That is, when battery exhaustion occurs in the low voltage battery 23 of the vehicle, power of the simplified power supply 25A can be supplied to a load such as the DC/DC converter 22 to start the DC/DC converter 22. When the DC/DC converter 22 is started, the power stored in the high voltage battery 21 can be stepped down and supplied to the battery power supply line 41 and the low voltage battery 23. Accordingly, it is possible to secure the power supply power necessary for starting the engine and the like without using the jump start technique.

Configuration of Modification 8

Figure 10:
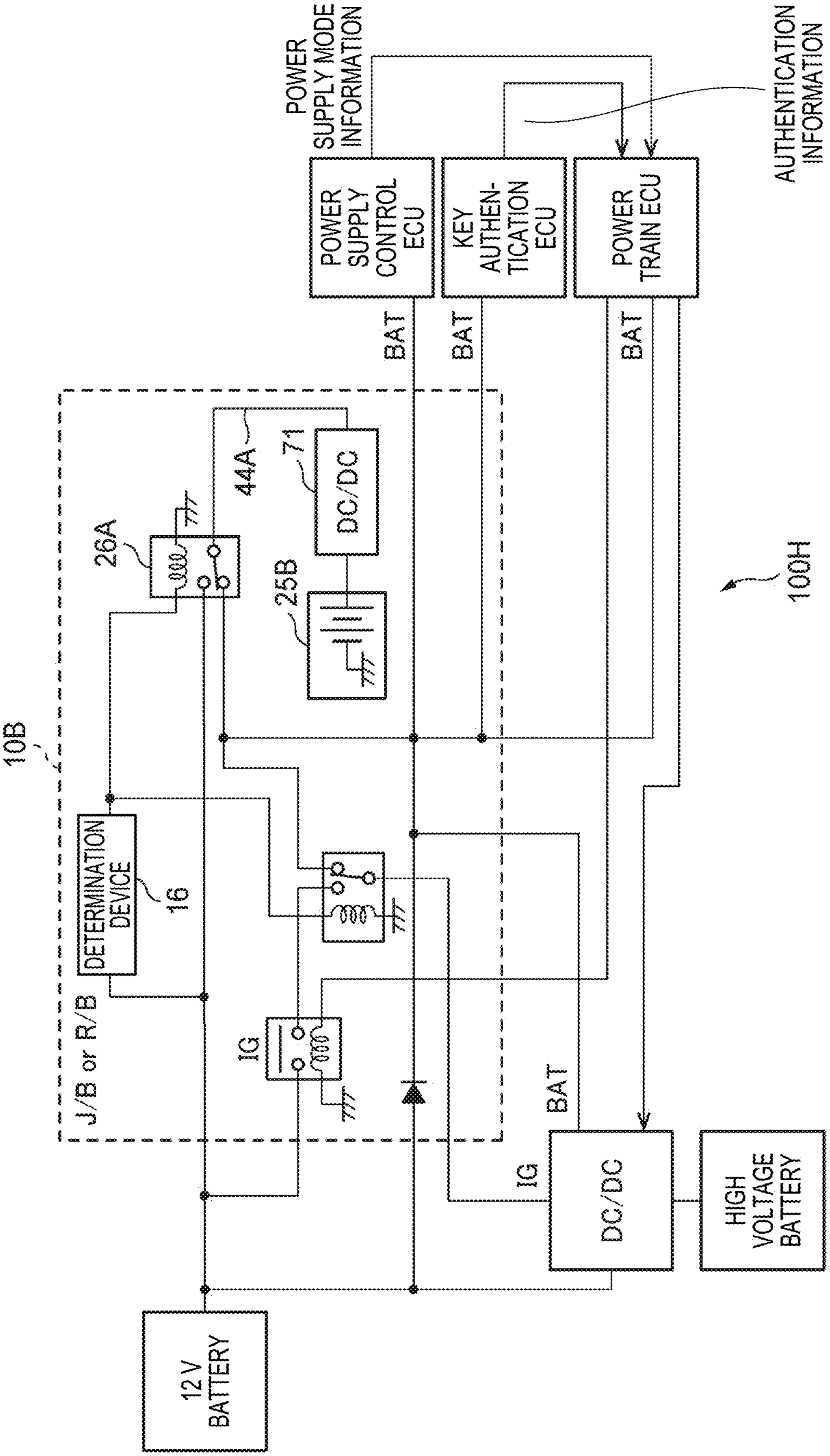
FIG. 10 is an electric circuit diagram showing a power supply control system according to Modification 8.

FIG. 10 is an electric circuit diagram showing a power supply control system 100H according to Modification 8. The power supply control system 100H of FIG. 10 is a modification of the power supply control system 100F of FIG. 8.

In the power supply control system 100H shown in FIG. 10, the electric junction box 10B includes the simplified power supply 25B instead of the simplified power supply 25 in FIG. 8, and the DC/DC converter 71. Other configurations and operations of the electric junction box 10B are the same as those in the case of FIG. 8.

The simplified power supply 25B in FIG. 10 is configured as a battery pack in which a plurality of dry batteries are combined and integrated. The output voltage of the battery pack is lower than a specified voltage (for example, +12 [V]) of the low voltage battery 23.

The DC/DC converter 71 added to the electric junction box 10B shown in FIG. 10 boosts the DC voltage output by the simplified power supply 25B to generate a specified DC voltage (for example, +12 [V]).

As shown in FIG. 10, the output terminal on the positive side of the simplified power supply 25B is connected to the input of the DC/DC converter 71, and the output terminal on the negative side of the simplified power supply 25B is connected to the ground. The output of the DC/DC converter 71 is connected to the terminal T23 of the electric junction box 10. Therefore, the simplified power supply 25B and the DC/DC converter 71 in FIG. 10 have the same function as the simplified power supply 25 in FIG. 8.

That is, when battery exhaustion occurs in the low voltage battery 23 of the vehicle, the power output by the simplified power supply 25B can be boosted by the DC/DC converter 71 and supplied to a load such as the DC/DC converter 22 to start the DC/DC converter 22. When the DC/DC converter 22 is started, the power stored in the high voltage battery 21 can be stepped down and supplied to the battery power supply line 41 and the low voltage battery 23. Accordingly, it is possible to secure the power supply power necessary for starting the engine and the like without using the jump start technique.

Configuration of Modification 9

Figure 11:
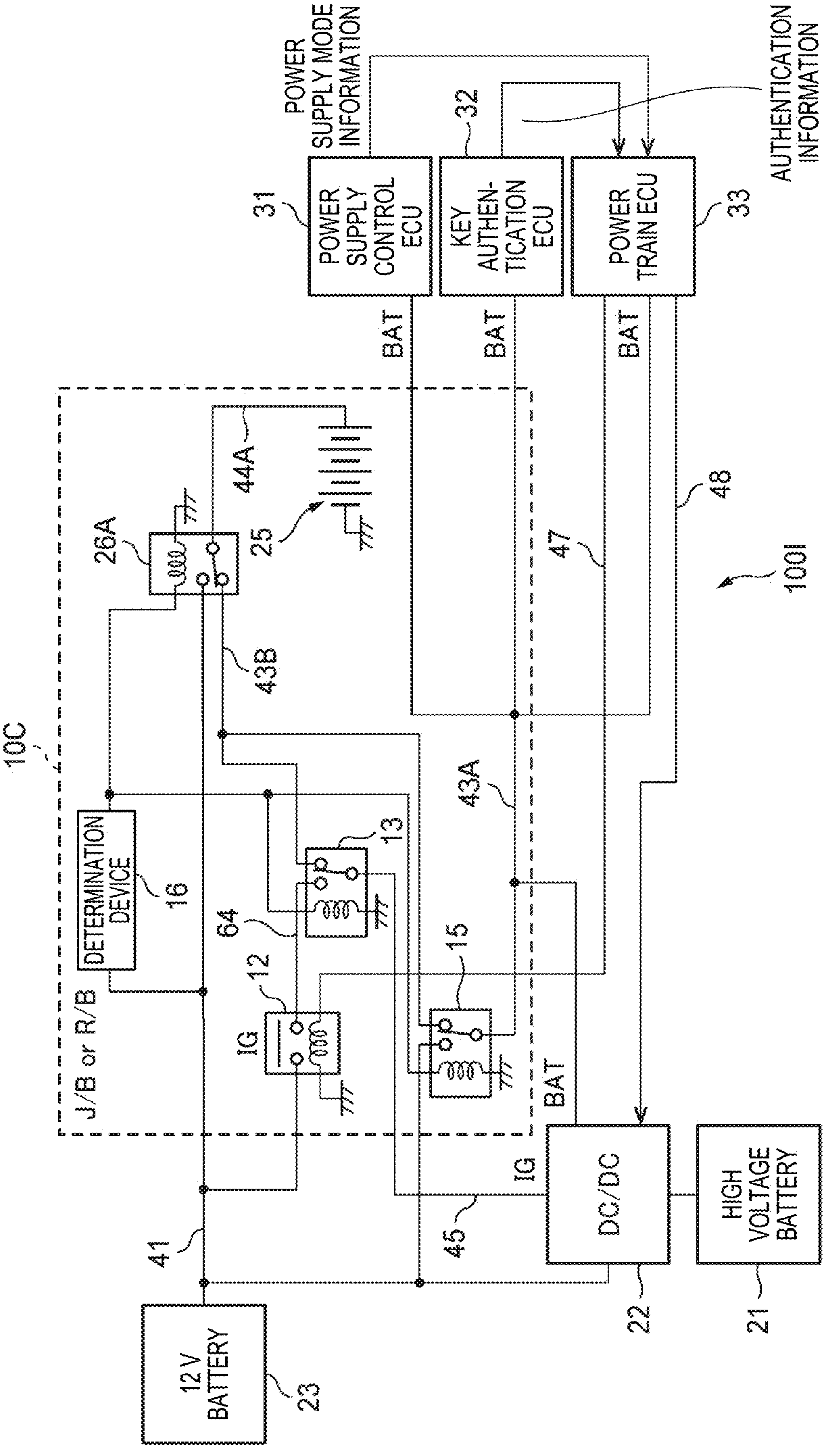
FIG. 11 is an electric circuit diagram showing a power supply control system according to Modification 9.

FIG. 11 is an electric circuit diagram showing a power supply control system 100I according to Modification 9. The configuration of the power supply control system 100I of FIG. 11 is a modification of the power supply control system 100F of FIG. 8.

An electric junction box 10C of the power supply control system 100I shown in FIG. 11 includes the path switching relay 15 instead of the backflow prevention element 14 shown in FIG. 8. The path switching relay 15 includes a switch having an electric coil for driving a contact and two electric contacts that can be selectively connected. An electric coil of the path switching relay 15 has one terminal connected to the load side power supply line 43B and the other terminal connected to the ground.

The switch of the path switching relay 15 can selectively connect a terminal connected to the load side power supply line 43A to either a contact of the battery power supply line 41 or a contact of the load side power supply line 43B. Since the electric coil of the path switching relay 15 is connected to the load side power supply line 43B, a selection state of the switch of the path switching relay 15 is automatically switched according to whether a voltage is applied to the load side power supply line 43B.

The BAT line connection terminal 22*c* of the DC/DC converter 22 and respective BAT power supply input terminals of the power supply control ECU 31, the key authentication ECU 32 and the power train ECU 33 are each connected to the load side power supply line 43A.

When a prescribed voltage is applied to the load side power supply line 43B, the switch of the path switching relay 15 connects the load side power supply line 43B and the load side power supply line 43A. When a prescribed voltage is not applied to the load side power supply line 43B, the switch of the path switching relay 15 connects the battery power supply line 41 and the load side power supply line 43A.

That is, the path switching relay 15 can automatically switch a path of a supply source of a power supply power for a BAT system of the DC/DC converter 22, the power supply control ECU 31, the key authentication ECU 32, and the power train ECU 33.

Operation of Modification 9

Operation of the power supply control system 100I shown in FIG. 11 will be described below.

When the battery exhaustion occurs in the low voltage battery 23, the determination device 16 detects the voltage drop of the battery power supply line 41, and the mode switching relay 26A is switched from the normal mode to the emergency start mode (state shown in FIG. 11). Further, the switch of the path switching relay 13 is switched by the signal output from the determination device 16. Accordingly, the engine or the like can be started as described below.

In this case, as shown in FIG. 11, the switch of the mode switching relay 26A connects the switch common line 44 and the load side power supply line 43B. Accordingly, the prescribed DC voltage (for example, +12 [V]) output from the simplified power supply 25 is supplied to the load side power supply line 43B via the switch common line 44A and the mode switching relay 26A.

Accordingly, the electric coil of the path switching relay 13 is energized, and the switch of the path switching relay 13 connects the load side power supply line 43B and the IG output power supply line 45. Further, the electric coil of the path switching relay 15 is energized, and the switch of the path switching relay 15 connects the load side power supply line 43B and the load side power supply line 43A.

Accordingly, power supply power from the simplified power supply 25 is supplied to the BAT line connection terminal 22*c* and the IG line connection terminal 22*d* of the DC/DC converter 22, and to the respective BAT power supply input terminals of the power supply control ECU 31, the key authentication ECU 32, and the power train ECU 33.

In this state, necessary power supply power is supplied to the BAT line connection terminal 22*c* and the IG line connection terminal 22*d* of the DC/DC converter 22. Accordingly, when the power train ECU 33 controls a signal of the control line 48, an operation of an internal circuit of the DC/DC converter 22 can be initiated.

When the DC/DC converter 22 is started, the high voltage power supplied from the high voltage battery 21 is stepped down by the internal circuit of the DC/DC converter 22, and appears on the low-voltage side output terminal 22*b* as low-voltage power supply power.

The low-voltage power supply power output to the low-voltage side output terminal 22*b* of the DC/DC converter 22 is supplied to the battery power supply line 41. Accordingly, the power stored in the high voltage battery 21 can be used to charge the low voltage battery 23.

When the engine or the like of the vehicle successfully starts up and the voltage of the battery power supply line 41 returns to the normal state, the determination device 16 detects this and automatically switches the selection state of the mode switching relay 26A and the path switching relay 13. That is, the switch of the path switching relay 13 is switched to a state of connecting the IG input power supply line 64 and the IG output power supply line 45, and the switch of the path switching relay 15 is switched to a state of connecting the battery power supply line 41 and the load side power supply line 43A.

Accordingly, supply of power supply power to the IG line connection terminal 22*d* of the DC/DC converter 22 can be continued through a path passing through the battery power supply line 41, the IG relay 12, the path switching relay 13, and the IG output power supply line 45. Further, supply of power supply power to the BAT line connection terminal 22*c* of the DC/DC converter 22 and the respective BAT power supply input terminals of the power supply control ECU 31, the key authentication ECU 32, and the power train ECU 33 can be continued through a path passing through the battery power supply line 41, the path switching relay 15, and the load side power supply line 43A.

That is, when the engine or the like of the vehicle cannot start up due to the battery exhaustion of the low voltage battery 23, as long as sufficient power supply power can be supplied from the simplified power supply 25 just until the internal circuit of the DC/DC converter 22 starts up, the power supply power stored in the high voltage battery 21 side can be used thereafter, and thus the engine or the like can easily start up. Therefore, even if the simplified power supply 25 has a small size and a fairly small amount of power that can be supplied, the simplified power supply 25 can be sufficiently used as a power supply for emergency to start the vehicle.

Configuration of Modification 10

Figure 12:
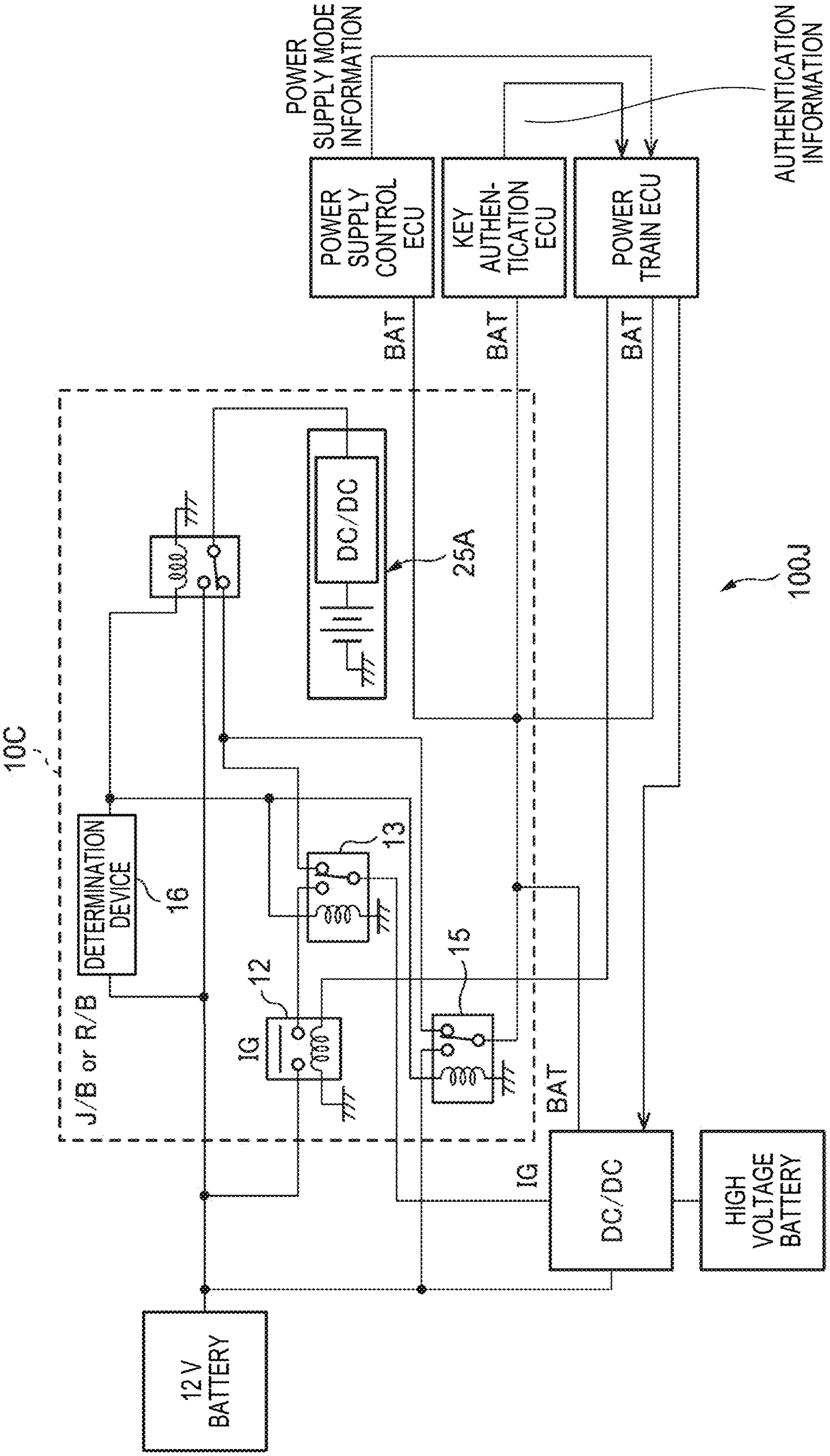
FIG. 12 is an electric circuit diagram showing a power supply control system according to Modification 10.

FIG. 12 is an electric circuit diagram showing a power supply control system 100J according to Modification 10. The configuration of the power supply control system 100J of FIG. 12 is a modification of the power supply control system 100I of FIG. 11.

In the power supply control system 100J shown in FIG. 12, the electric junction box 10C includes the simplified power supply 25A instead of the simplified power supply 25 of FIG. 11. Other configurations and operations of the electric junction box 10C are the same as those in the case of FIG. 11.

The simplified power supply 25A in FIG. 12 is a device in which a built-in battery 25Aa and a DC/DC converter 25Ab are integrated as a power supply module. The DC/DC converter 25Ab boosts the DC voltage output from the built-in battery 25Aa to generate a specified DC voltage (for example, +12 [V]).

As shown in FIG. 12, the output terminal on the positive side of the simplified power supply 25A is connected to the terminal T23 of the electric junction box 10B, and the output terminal on the negative side of the simplified power supply 25A is connected to the ground. Therefore, the simplified power supply 25A in FIG. 12 has the same function as the simplified power supply 25 in FIG. 11.

That is, when battery exhaustion occurs in the low voltage battery 23 of the vehicle, power of the simplified power supply 25A can be supplied to a load such as the DC/DC converter 22 to start the DC/DC converter 22. When the DC/DC converter 22 is started, the power stored in the high voltage battery 21 can be stepped down and supplied to the battery power supply line 41 and the low voltage battery 23. Accordingly, it is possible to secure the power supply power necessary for starting the engine and the like without using the jump start technique.

Configuration of Modification 11

Figure 13:
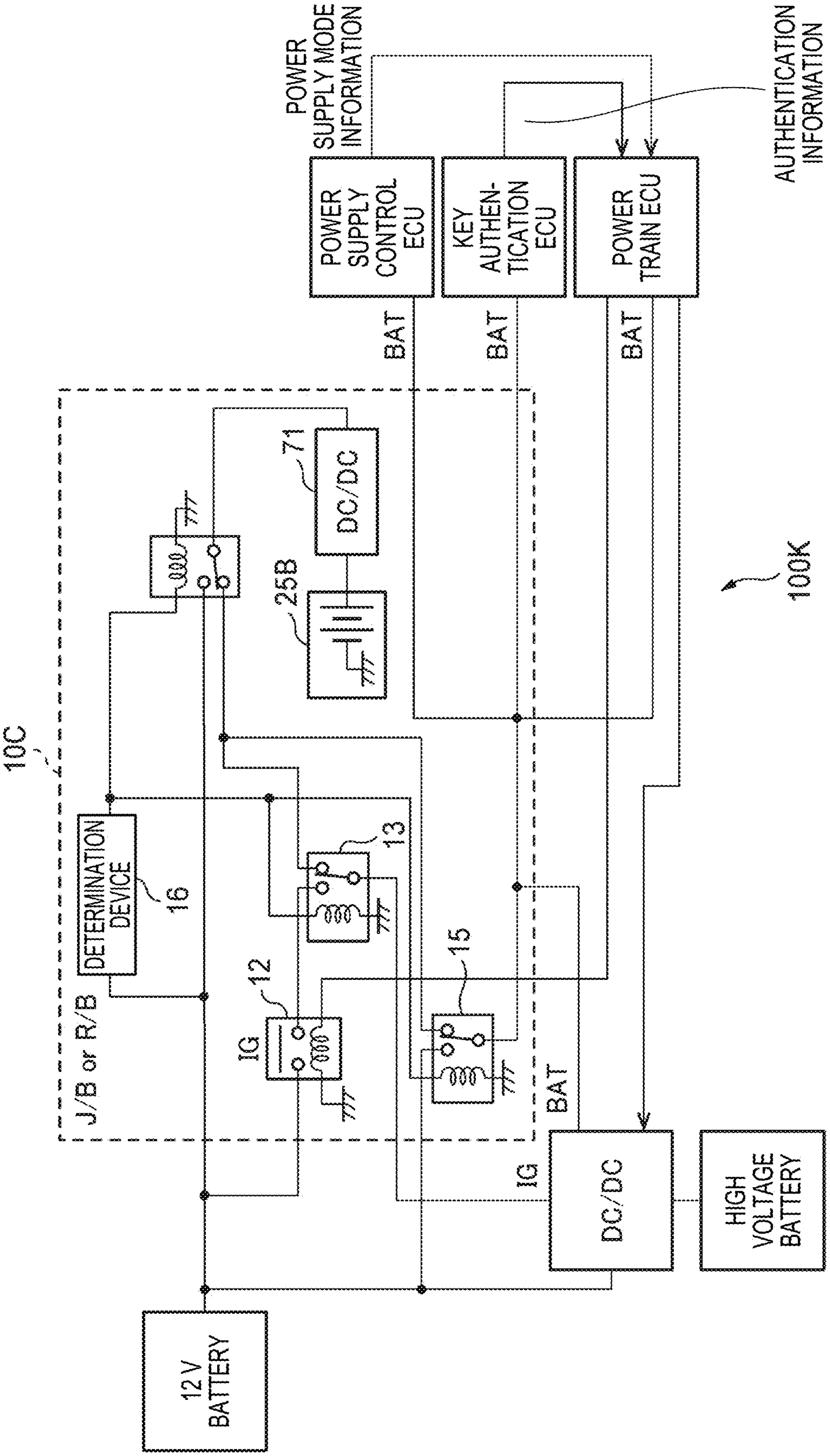
FIG. 13 is an electric circuit diagram showing a power supply control system according to Modification 11.

FIG. 13 is an electric circuit diagram showing a power supply control system 100K according to Modification 11. The configuration of the power supply control system 100K of FIG. 13 is a modification of the power supply control system 100I of FIG. 11.

In the power supply control system 100K shown in FIG. 13, the electric junction box 10C includes the simplified power supply 25B instead of the simplified power supply 25 in FIG. 11, and the DC/DC converter 71. Other configurations and operations of the electric junction box 10C are the same as those in the case of FIG. 11.

The simplified power supply 25B in FIG. 13 is configured as a battery pack in which a plurality of dry batteries are combined and integrated. The output voltage of the battery pack is lower than a specified voltage (for example, +12 [V]) of the low voltage battery 23.

The DC/DC converter 71 added to the electric junction box 10C shown in FIG. 13 boosts the DC voltage output by the simplified power supply 25B to generate a specified DC voltage (for example, +12 [V]).

As shown in FIG. 13, the output terminal on the positive side of the simplified power supply 25B is connected to the input of the DC/DC converter 71, and the output terminal on the negative side of the simplified power supply 25B is connected to the ground. The output of the DC/DC converter 71 is connected to the terminal T23 of the electric junction box 10. Therefore, the simplified power supply 25B and the DC/DC converter 71 in FIG. 13 have the same function as the simplified power supply 25 in FIG. 11.

That is, when battery exhaustion occurs in the low voltage battery 23 of the vehicle, the power output by the simplified power supply 25B can be boosted by the DC/DC converter 71 and supplied to a load such as the DC/DC converter 22 to start the DC/DC converter 22. When the DC/DC converter 22 is started, the power stored in the high voltage battery 21 can be stepped down and supplied to the battery power supply line 41 and the low voltage battery 23. Accordingly, it is possible to secure the power supply power necessary for starting the engine and the like without using the jump start technique.

As described above, in a vehicle equipped with the power supply control system 100 including the electric junction box 10 shown in FIGS. 1, 2, and the like, when battery exhaustion occurs in the low voltage battery 23, power from the simplified power supply 25 provided in the electric junction box 10 is used to secure the power supply power necessary for starting the engine and the like, so that the DC/DC converter 22 can be started. Further, the power stored in the high voltage battery 21 can be used after the internal circuit of the DC/DC converter 22 is started, and thus the small-sized simplified power supply 25 having a small power capacity can be used. Accordingly, troublesome and time-consuming work such as jump start is not necessary.

The present invention is not limited to the embodiments described above and can be appropriately modified, improved and the like. In addition, materials, shapes, sizes, numbers, arrangement positions, or the like of components in the above embodiment are freely selected and are not limited as long as the present invention can be implemented.

For example, in the example shown in FIG. 1, the simplified power supply 25 is disposed in an exposed state on the outside of the housing 70. Alternatively, the simplified power supply 25 may be disposed in an internal space of the housing 70, and the outside of the simplified power supply 25 may be covered with an openable and closable lid. The battery of the simplified power supply 25 may be a dry battery or a secondary battery. When a secondary battery is built in the simplified power supply 25, the simplified power supply 25 may be charged using the power supply power on the low voltage battery 23.

Here, features of an electric junction box for a vehicle according to the above described embodiments of the present invention will be briefly summarized and listed in the following [1] to [5]. [1] An electric junction box for a vehicle (electric junction box 10), including:

- a junction box housing (housing 70);
- a low-voltage power supply input terminal (terminals T11 to T13) provided in the junction box housing and configured to receive output power from a low voltage battery (23) mounted on a vehicle;
- one or more low-voltage load output terminals (terminals T31 to T34) provided in the junction box housing and configured to supply, to an in-vehicle device mounted on the vehicle, power supply power generated based on power supplied to at least the low-voltage power supply input terminal;
- an operating voltage output terminal (terminal T35) provided in the junction box housing and configured to supply, to a prescribed voltage converter (DC/DC converter 22), an operating voltage required for the voltage converter to operate at least at a start of the vehicle; an auxiliary power supply (simplified power supply 25) provided in the junction box housing; and
- a switch circuit (path switching relay 13) provided in the junction box housing and configured to selectively switch between first power supplied to the low-voltage power supply input terminal and second power output from the auxiliary power supply to generate the operating voltage at least at a start of the vehicle.

The junction box housing has an external switch terminal (terminals T21 to T23).

The external switch terminal includes a first circuit (switch common line 44) for an output of the auxiliary power supply, a second circuit (battery power supply line 41) connected to the low voltage battery, and a third circuit (load side power supply line 43) connected to a battery line connection terminal of the voltage converter and a control unit for controlling starting of the voltage converter.

The electric junction box for a vehicle further includes an ignition relay circuit configured to switch between opening and closing of a connection between a battery power supply line connected to the low-voltage power supply input terminal and an ignition input power supply line, the opening and closing of the connection being controlled by the control unit.

The switch circuit selectively switches a connect destination of an ignition line connection terminal of the voltage to either the third circuit or the ignition input power supply line, and a selection state switched by the switch circuit state is automatically switched according to whether a voltage is applied to the third line.

In a vehicle equipped with the electric junction box for a vehicle having the configuration of [1], when the battery exhaustion occurs in the low voltage battery, the power output from the auxiliary power supply can be supplied to the voltage converter via the switch circuit. Therefore, the voltage converter can be started even when the battery is exhausted. After the voltage converter is started, a voltage that can be supplied from a circuit of a different system such as the high voltage battery can be converted by the voltage converter and supplied to the low voltage battery, so that the engine and the like of the vehicle can be started in the same way as in normal operation. Therefore, laborious and time-consuming work such as jump start is not necessary.

[2] In the electric junction box for a vehicle according to [1],

- the voltage converter has a function of generating low-voltage power supply power equivalent to an output of the low voltage battery from an output of a high voltage battery (21) mounted on the vehicle,
- the junction box housing (housing 70) includes an auxiliary power supply accommodation portion (battery case 25*b*) in which the auxiliary power supply is detachably accommodated, and
- the auxiliary power supply (simplified power supply 25) has a function of supplying low-voltage power supply power equivalent to an output of the low voltage battery.

According to the electric junction box for a vehicle having the configuration of [2], when the battery exhaustion occurs in the low voltage battery, the power supply power necessary for starting the voltage converter can be supplied from the auxiliary power supply. Further, the auxiliary power supply is detachable, and therefore, it is easy to maintain an appropriate condition by, for example, performing work such as periodic replacement so that necessary power can be supplied at any time in an emergency. This makes it possible to reliably start the engine and the like of the vehicle when the battery is exhausted. Further, after the voltage converter is started, by using the voltage converter, the high voltage power stored in the high voltage battery can be stepped down, and the low voltage power required by a circuit on the low voltage battery side can be generated. In this case, even if the power capacity of the auxiliary power supply is small, the engine or the like can be easily started.

[3] In the electric junction box for a vehicle according to [1],

- an external switch (mode switch 26) connected to the external switch terminal selectively connects the first circuit to either the second circuit and or the third circuit.

According to the electric junction box for a vehicle having the configuration of [3], a user can switch between modes as necessary by operating the external switch. That is, when starting the vehicle in which the battery exhaustion occurs in the low voltage battery, the user operates the external switch to supply the power from the auxiliary power supply to the load side, and the power can be used only for starting the engine or the like.

In the electric junction box for a vehicle (electric junction box 10B) according to [1], the switch circuit includes a voltage detection circuit (determination device 16) configured to detect a drop in an output voltage of the low voltage battery, a first switch (mode switching relay 26A) configured to selectively connect an output of the auxiliary power supply to either a circuit of the low voltage battery or a load side circuit including the voltage converter and other loads, and a second switch (path switching relay 13) configured to supply a voltage of the load side circuit to the voltage converter as the operating voltage, and the voltage detection circuit controls the first switch and the second switch.

According to the electric junction box for a vehicle having the above configuration, when starting the vehicle in which the battery exhaustion occurs in the low voltage battery, the power from the auxiliary power supply can be supplied to the load side without the need for a user to operate a switch, and the power can be used for starting the engine or the like. In addition, the first switch and the second switch can control two independent circuits, so that appropriate voltages can be supplied to the power supply lines of the BAT system and the IG system on the vehicle, for example.

[4] In the electric junction box for a vehicle (electric junction box 10) according to [1], the switch circuit includes a backflow prevention circuit (backflow prevention element 14) connected between an output circuit (battery power supply line 41) of the low voltage battery and a load side circuit (load side power supply line 43) including the voltage converter and other loads.

According to the electric junction box for a vehicle having the configuration of [4], when the battery exhaustion occurs in the low voltage battery, the power supply power output from the auxiliary power supply can be prevented from flowing into a circuit on the low voltage battery side. Therefore, it is possible to avoid an overload on a downstream side of the auxiliary power supply, and to maintain the power supply voltage of the auxiliary power supply at a high level. When the power supply voltage on the low voltage battery side is recovered, the power on the low voltage battery side can be supplied to the load side via the backflow prevention circuit, so that the power consumption of the auxiliary power supply can be reduced to the minimum limit.

The present application is based on a Japanese patent application (No. 2022-154024) filed on Sep. 27, 2022, contents of which are incorporated herein by reference.

What is claimed is:

1. An electric junction box for a vehicle, comprising:

a junction box housing;

a low-voltage power supply input terminal provided in the junction box housing and configured to receive output power from a low voltage battery mounted on a vehicle;

one or more low-voltage load output terminals provided in the junction box housing and configured to supply, to an in-vehicle device mounted on the vehicle, power supply power generated based on power supplied to at least the low-voltage power supply input terminal;

an operating voltage output terminal provided in the junction box housing and configured to supply, to a prescribed voltage converter, an operating voltage required for the voltage converter to operate at least at a start of the vehicle;

an auxiliary power supply provided in the junction box housing; and a switch circuit provided in the junction box housing and configured to selectively switch between first power supplied to the low-voltage power supply input terminal and second power output from the auxiliary power supply to generate the operating voltage at least at a start of the vehicle, wherein the junction box housing has an external switch terminal, wherein the external switch terminal includes a first circuit for an output of the auxiliary power supply, a second circuit connected to the low voltage battery, and a third circuit connected to a battery line connection terminal of the voltage converter and a control unit for controlling starting of the voltage converter, wherein the electric junction box for a vehicle further includes an ignition relay circuit configured to switch between opening and closing of a connection between a battery power supply line connected to the low-voltage power supply input terminal and an ignition input power supply line, the opening and closing of the connection being controlled by the control unit, and wherein the switch circuit selectively switches a connect destination of an ignition line connection terminal of the voltage converter to either the third circuit or the ignition input power supply line, and a selection state switched by the switch circuit state is automatically switched according to whether a voltage is applied to the third line.

2. The electric junction box for a vehicle according to claim 1, wherein the voltage converter has a function of generating low-voltage power supply power equivalent to an output of the low voltage battery from an output of a high voltage battery mounted on the vehicle, wherein the junction box housing includes an auxiliary power supply accommodation portion in which the auxiliary power supply is detachably accommodated, and wherein the auxiliary power supply has a function of supplying low-voltage power supply power equivalent to an output of the low voltage battery.

3. The electric junction box for a vehicle according to claim 1, wherein an external switch connected to the external switch terminal selectively connects the first circuit to either the second circuit and or the third circuit.

4. The electric junction box for a vehicle according to claim 1, wherein the switch circuit includes a backflow prevention circuit connected between an output circuit of the low voltage battery and a load side circuit including the voltage converter and other loads.

* * * * *